US012711278B2

(12) United States Patent
Namiki

(10) Patent No.: US 12,711,278 B2
(45) Date of Patent: Aug. 18, 2026

(54) NODE AND METHOD FOR SHARING DATA

(71) Applicant: Hitoshi Namiki, Kanagawa (JP)

(72) Inventor: Hitoshi Namiki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 63 days.

(21) Appl. No.: 18/396,735

(22) Filed: Dec. 27, 2023

(65) Prior Publication Data

US 2024/0220665 A1 Jul. 4, 2024

(30) Foreign Application Priority Data

Dec. 28, 2022 (JP) ................................ 2022-212032

(51) Int. Cl.

*G06F 21/64* (2013.01)
*G06Q 20/38* (2012.01)
*G06Q 50/06* (2024.01)
*H04L 9/00* (2022.01)

(52) U.S. Cl.

CPC ........... *G06F 21/64* (2013.01); *G06Q 20/389* (2013.01); *G06Q 50/06* (2013.01); *H04L 9/50* (2022.05); *H04L 2209/56* (2013.01)

(58) Field of Classification Search

CPC ...... G06F 21/64; G06Q 20/389; G06Q 50/06; G06Q 40/12; G06Q 30/0605; G06Q 40/04; H04L 9/50; H04L 2209/56; H04L 67/10; H04L 67/104

See application file for complete search history.

(56) References Cited

U.S. PATENT DOCUMENTS

2019/0295193 A1* 9/2019 Winand ............... G06Q 20/065
2020/0034457 A1* 1/2020 Brody .................. H04L 9/0819
2021/0264414 A1* 8/2021 Ikemoto .............. G06Q 20/405
2021/0295454 A1 9/2021 Mayuzumi
2021/0295455 A1 9/2021 Aoshima et al.
2021/0296895 A1 9/2021 Mayuzumi
2021/0365909 A1* 11/2021 Shiina .................. H04L 9/3239
2022/0101454 A1 3/2022 Mayuzumi
2022/0101455 A1 3/2022 Mayuzumi
2022/0179378 A1 6/2022 Gourisetti et al.
2022/0294630 A1* 9/2022 Collen .................. G06Q 20/36
2022/0302751 A1 9/2022 Namiki
2022/0414623 A1 12/2022 Kasamatsu
2023/0006839 A1 1/2023 Kasamatsu
2023/0006847 A1 1/2023 Mayuzumi
2023/0016373 A1 1/2023 Kasamatsu (Continued)

FOREIGN PATENT DOCUMENTS

JP 2019-144851 A 8/2019

OTHER PUBLICATIONS

Extended European Search Report issued Feb. 14, 2024 in European Patent Application No. 23219193.2, 7 pages.

*Primary Examiner* — Mohammed Waliullah
(74) *Attorney, Agent, or Firm* — XSENSUS LLP

(57) ABSTRACT

A node on a blockchain network, includes: a memory that stores asset related data including information on an owner of an asset, and contract related data including a transaction price of the asset or a ratio corresponding to the price of the asset; and circuitry to transmit the asset related data and the contract related data to one or more other nodes on the blockchain network to share the asset related data and the contract related data.

8 Claims, 22 Drawing Sheets

(56) References Cited

U.S. PATENT DOCUMENTS

| | | | | |
|---|---|---|---|---|
| 2023/0020412 | A1 | 1/2023 | Mayuzumi | |
| 2023/0229795 | A1 * | 7/2023 | Sato | G06F 21/6218<br>726/27 |

* cited by examiner

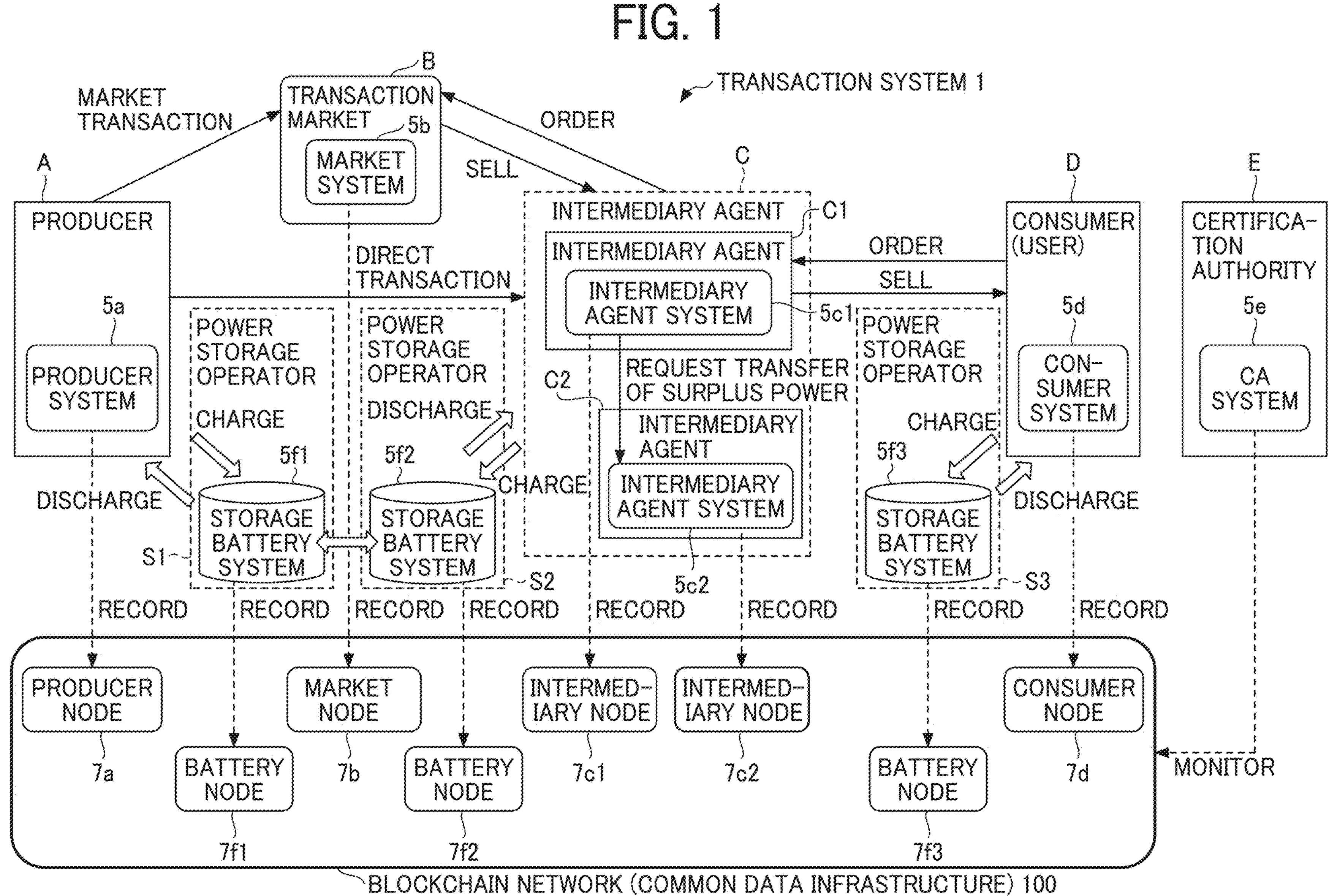
FIG. 1
TRANSACTION SYSTEM 1
MARKET TRANSACTION
B
TRANSACTION MARKET
5b
MARKET SYSTEM
ORDER
SELL
A
PRODUCER
5a
PRODUCER SYSTEM
DIRECT TRANSACTION
C
INTERMEDIARY AGENT
C1
INTERMEDIARY AGENT
INTERMEDIARY AGENT SYSTEM
5c1
REQUEST TRANSFER OF SURPLUS POWER
C2
INTERMEDIARY AGENT
INTERMEDIARY AGENT SYSTEM
5c2
D
CONSUMER (USER)
ORDER
SELL
5d
CON-SUMER SYSTEM
E
CERTIFICA-TION AUTHORITY
5e
CA SYSTEM
POWER STORAGE OPERATOR
CHARGE
5f1
STORAGE BATTERY SYSTEM
S1
DISCHARGE
POWER STORAGE OPERATOR
DISCHARGE
5f2
STORAGE BATTERY SYSTEM
S2
CHARGE
POWER STORAGE OPERATOR
CHARGE
5f3
STORAGE BATTERY SYSTEM
S3
DISCHARGE
RECORD
PRODUCER NODE
7a
BATTERY NODE
7f1
MARKET NODE
7b
BATTERY NODE
7f2
INTERMED-IARY NODE
7c1
INTERMED-IARY NODE
7c2
BATTERY NODE
7f3
CONSUMER NODE
7d
MONITOR
BLOCKCHAIN NETWORK (COMMON DATA INFRASTRUCTURE) 100

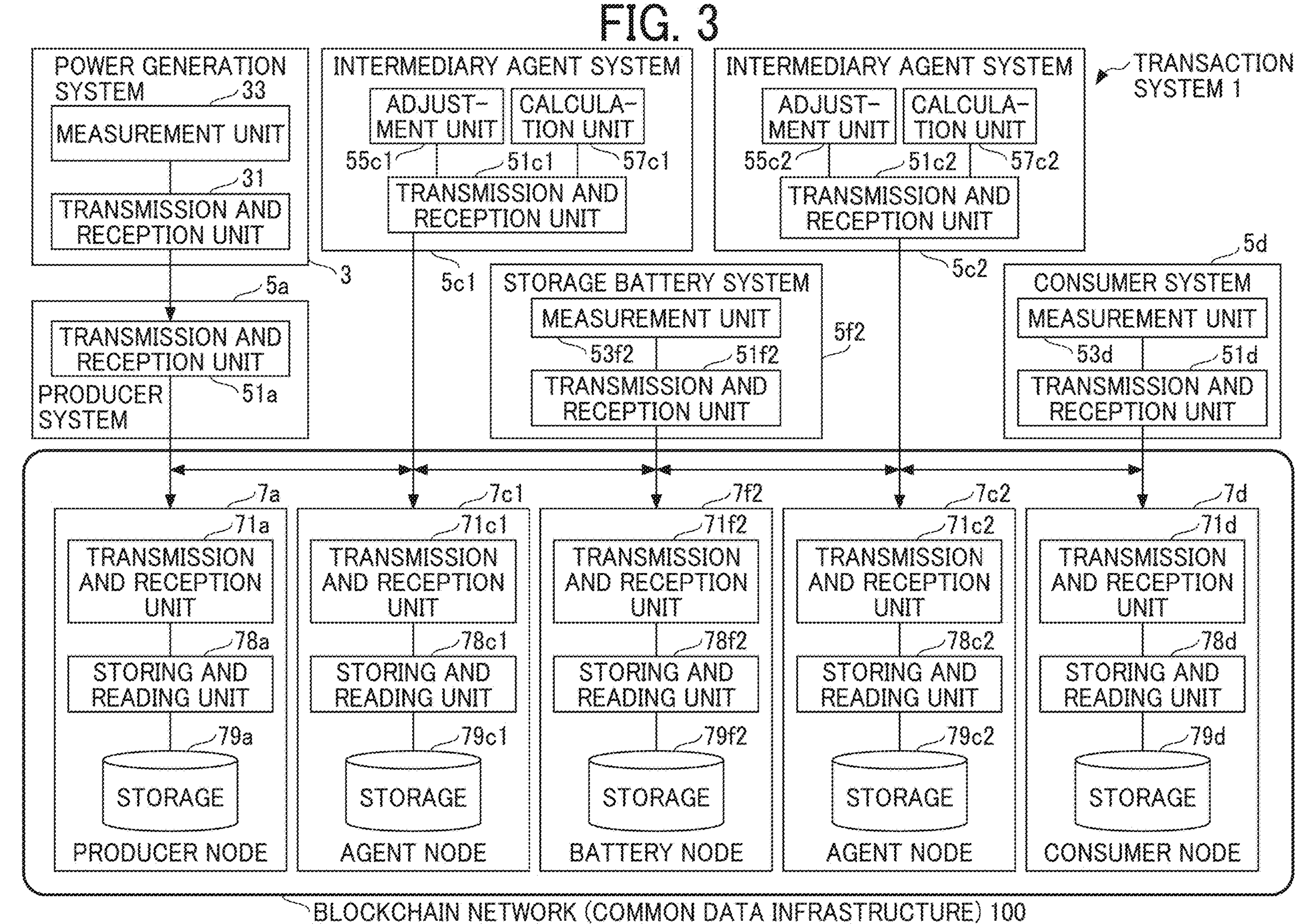
FIG. 3
POWER GENERATION SYSTEM
33
MEASUREMENT UNIT
31
TRANSMISSION AND RECEPTION UNIT
3
INTERMEDIARY AGENT SYSTEM
ADJUST-MENT UNIT
CALCULA-TION UNIT
55c1
51c1
57c1
TRANSMISSION AND RECEPTION UNIT
5c1
INTERMEDIARY AGENT SYSTEM
ADJUST-MENT UNIT
CALCULA-TION UNIT
55c2
51c2
57c2
TRANSMISSION AND RECEPTION UNIT
5c2
TRANSACTION SYSTEM 1
5a
TRANSMISSION AND RECEPTION UNIT
PRODUCER SYSTEM
51a
STORAGE BATTERY SYSTEM
MEASUREMENT UNIT
53f2
51f2
TRANSMISSION AND RECEPTION UNIT
5f2
5d
CONSUMER SYSTEM
MEASUREMENT UNIT
53d
51d
TRANSMISSION AND RECEPTION UNIT
7a
71a
TRANSMISSION AND RECEPTION UNIT
78a
STORING AND READING UNIT
79a
STORAGE
PRODUCER NODE
7c1
71c1
TRANSMISSION AND RECEPTION UNIT
78c1
STORING AND READING UNIT
79c1
STORAGE
AGENT NODE
7f2
71f2
TRANSMISSION AND RECEPTION UNIT
78f2
STORING AND READING UNIT
79f2
STORAGE
BATTERY NODE
7c2
71c2
TRANSMISSION AND RECEPTION UNIT
78c2
STORING AND READING UNIT
79c2
STORAGE
AGENT NODE
7d
71d
TRANSMISSION AND RECEPTION UNIT
78d
STORING AND READING UNIT
79d
STORAGE
CONSUMER NODE
BLOCKCHAIN NETWORK (COMMON DATA INFRASTRUCTURE) 100

FIG. 4

| No | FIELD NAME | TYPE | FIELD DEFINITION |
|---|---|---|---|
| 1 | docType | string | FIELD INDICATING DATA STRUCTURE TYPE ON BLOCKCHAIN |
| 2 | energyId | string | UNIQUE DATA ID OF DATA ON ELECTRIC POWER ON BLOCKCHAIN |
| 3 | state | string | TRANSACTION STATUS (GENERATE, SELL(TRANSFER), CONSUME) |
| 4 | energyType | string | PRODUCTION TYPE (CLASSIFICATION SUCH AS SOLAR LIGHT, WIND POWER) |
| 5 | renewableFlag | bool | FLAG INDICATING WHETHER POWER IS PRODUCED FROM RENEWABLE ENERGY |
| 6 | generatedDate | string | DATE/TIME OF POWER PRODUCTION |
| 7 | value | int | ELECTRIC POWER |
| 8 | linkOfAgreement | string | LINK INFORMATION OF STORAGE LOCATION OF DATA ON CONTRACT |
| 9 | generator | string | POWER GENERATOR (PRODUCER) |
| 10 | owner | string | CURRENT OWNER |
| 11 | prevOwner | string[] | PREVIOUS OWNER |
| 12 | rootEnergyId | string | DATA ID OF DATA ON POWER OF PARENT IN DIVIDING DATA ON POWER |
| 13 | branchAssets | string[] | DATA ID OF DATA ON POWER OF CHILD IN DIVIDING DATA ON POWER |
| 14 | extendedAttriute | string[] | EXTENDED ATTRIBUTES |

FIG. 5

| No | FIELD NAME | TYPE | FIELD DEFINITION |
|---|---|---|---|
| 1 | docType | string | FIELD INDICATING DATA STRUCTURE TYPE ON BLOCKCHAIN |
| 2 | surplusEnergyId | string | UNIQUE DATA ID OF DATA ON ELECTRIC POWER ON BLOCKCHAIN |
| 3 | state | string(orenum) | STATUS OF SURPLUS POWER (REGISTER, SELL (TRANSFER), SOLD(TRANSFERRED)) |
| 4 | renewableFlag | bool | FLAG INDICATING WHETHER POWER IS PRODUCED FROM RENEWABLE ENERGY |
| 5 | generatedDate | string(date) | DATE/TIME OF SURPLUS POWER GENERATION |
| 6 | totalValue | int | TOTAL SURPLUS POWER |
| 7 | value | int | REMAINING SURPLUS POWER |
| 8 | linkOfAgreement | string | LINK INFORMATION OF STORAGE LOCATION OF DATA ON CONTRACT |
| 9 | owner | string | CREATOR OF DATA ON SURPLUS POWER |
| 10 | rerateEnergyIds | string[] | ASSOCIATE WITH DATA ON POWER |
| 11 | extendedAttribute | string[] | EXTENDED ATTRIBUTES |

FIG. 6

| No | FIELD NAME | TYPE | FIELD DEFINITION |
|---|---|---|---|
| 1 | docType | string | FIELD INDICATING DATA STRUCTURE TYPE ON BLOCKCHAIN |
| 2 | shorgateEnergyId | string | UNIQUE DATA ID OF DATA ON POWER SHORTAGE ON BLOCKCHAIN |
| 3 | state | string(or enum) | STATUS OF POWER SHORTAGE (REGISTER, SHORTAGE, SUPPLIED) |
| 4 | renewableFlag | bool | FLAG INDICATING WHETHER POWER IS PRODUCED FROM RENEWABLE ENERGY |
| 5 | generatedDate | string(date) | DATE/TIME OF POWER SHORTAGE |
| 6 | totalValue | int | TOTAL POWER SHORTAGE |
| 7 | value | int | REMAINING POWER SHORTAGE |
| 8 | linkOfAgreement | string | LINK INFORMATION OF STORAGE LOCATION OF DATA ON CONTRACT |
| 9 | owner | string | CREATOR OF DATA ON POWER SHORTAGE |
| 10 | rerateEnergyIds | string[] | ASSOCIATE WITH DATA ON POWER |
| 11 | extendedAttribute | string[] | EXTENDED ATTRIBUTES |

FIG. 7

| No | FIELD NAME | TYPE | FIELD DEFINITION |
|---|---|---|---|
| 1 | docType | string | FIELD INDICATING DATA STRUCTURE TYPE ON BLOCKCHAIN |
| 2 | agreementId | string | UNIQUE DATA ID OF DATA ON CONTRACT ON BLOCKCHAIN |
| 3 | price | int | PRICE |
| 4 | ratio | Double (or float) | RATIO |
| 5 | energyId | string | DATA ID OF LINK SOURCE |

FIG. 8

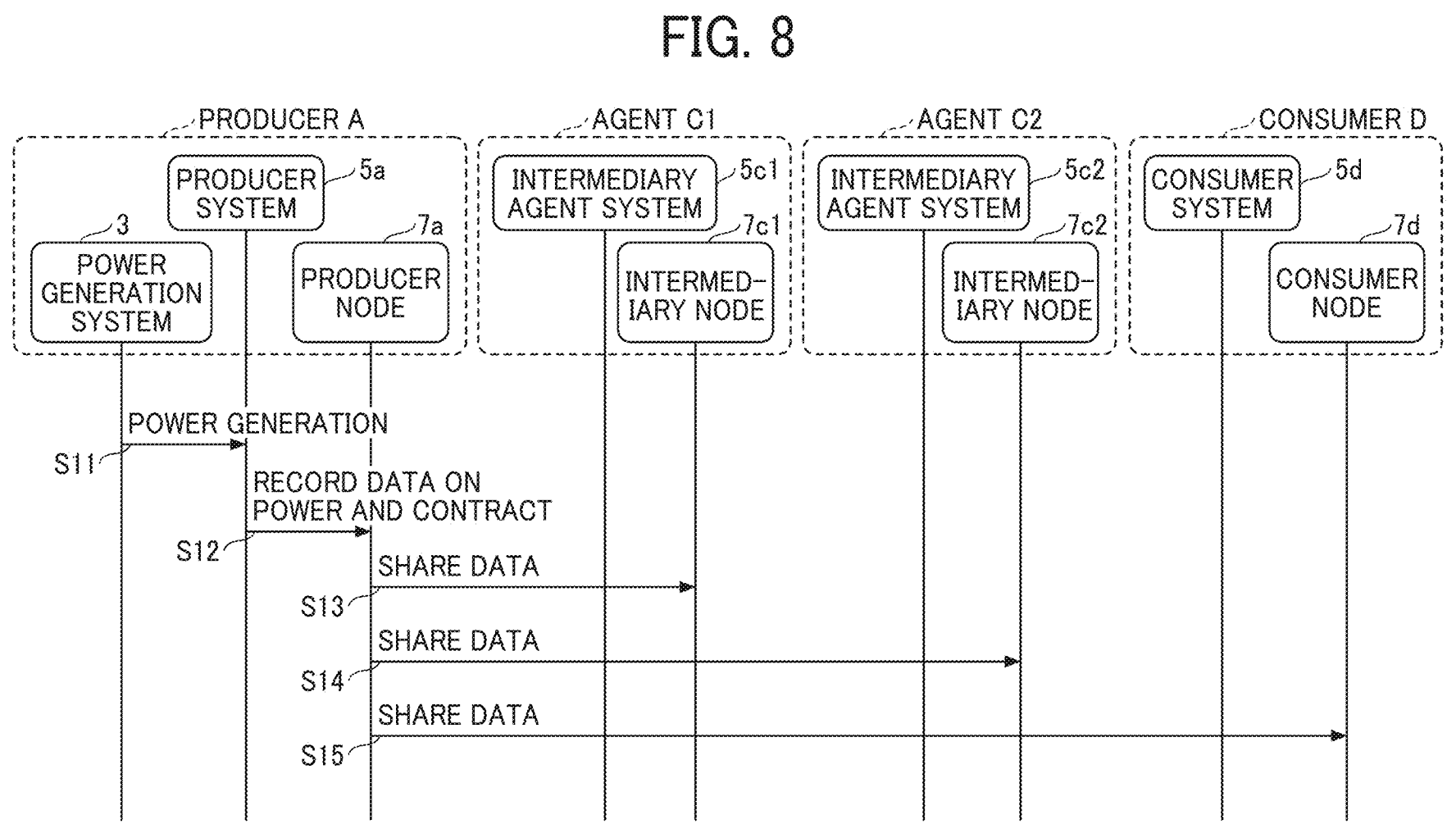

PRODUCER A
3
POWER GENERATION SYSTEM
5a
PRODUCER SYSTEM
7a
PRODUCER NODE
AGENT C1
5c1
INTERMEDIARY AGENT SYSTEM
7c1
INTERMED-IARY NODE
AGENT C2
5c2
INTERMEDIARY AGENT SYSTEM
7c2
INTERMED-IARY NODE
CONSUMER D
5d
CONSUMER SYSTEM
7d
CONSUMER NODE
S11
POWER GENERATION
S12
RECORD DATA ON POWER AND CONTRACT
S13
SHARE DATA
S14
SHARE DATA
S15
SHARE DATA

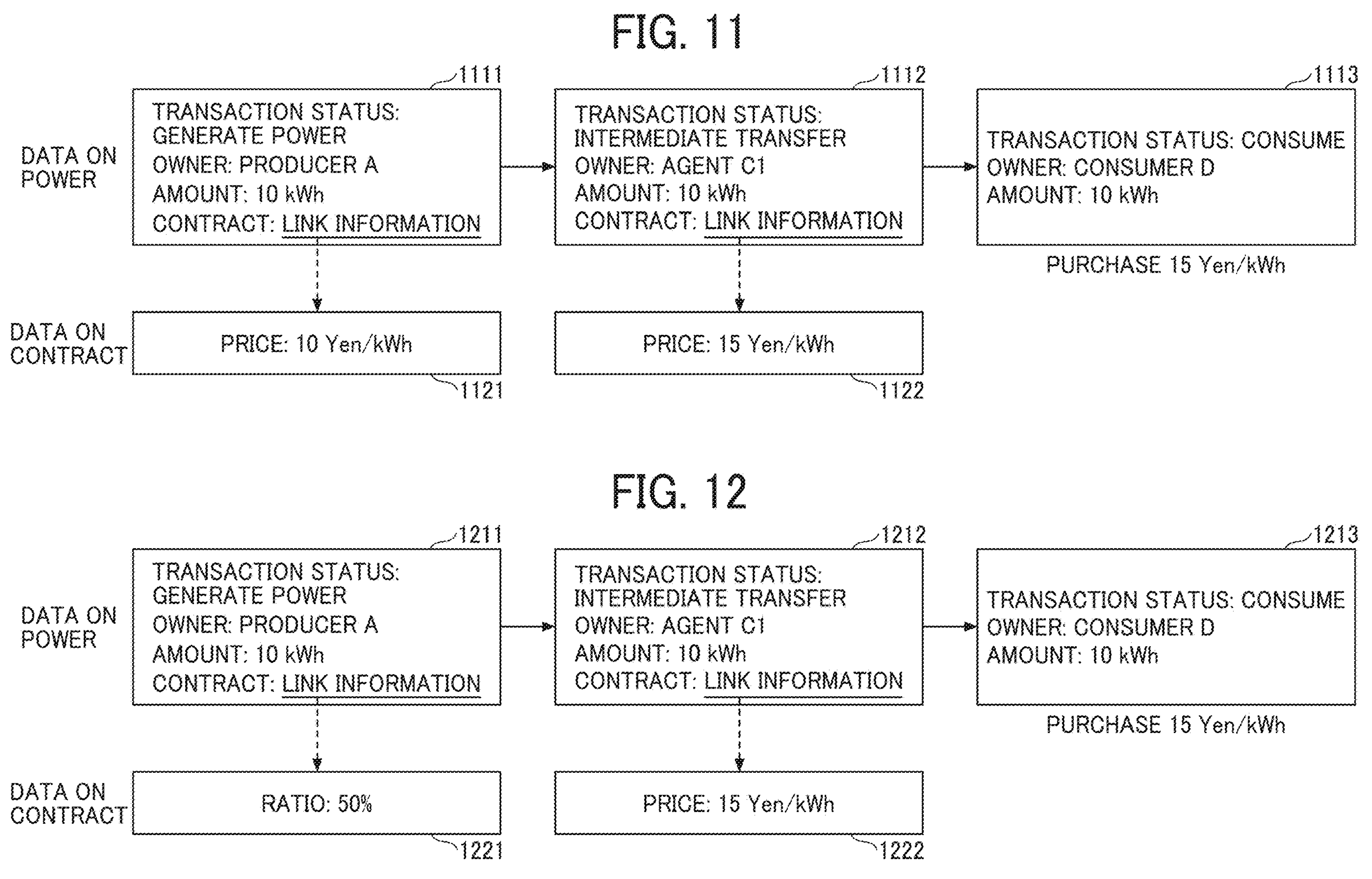
FIG. 11
1111
DATA ON POWER
TRANSACTION STATUS: GENERATE POWER
OWNER: PRODUCER A
AMOUNT: 10 kWh
CONTRACT: LINK INFORMATION
1112
TRANSACTION STATUS: INTERMEDIATE TRANSFER
OWNER: AGENT C1
AMOUNT: 10 kWh
CONTRACT: LINK INFORMATION
1113
TRANSACTION STATUS: CONSUME
OWNER: CONSUMER D
AMOUNT: 10 kWh
PURCHASE 15 Yen/kWh
DATA ON CONTRACT
PRICE: 10 Yen/kWh
1121
PRICE: 15 Yen/kWh
1122
FIG. 12
1211
DATA ON POWER
TRANSACTION STATUS: GENERATE POWER
OWNER: PRODUCER A
AMOUNT: 10 kWh
CONTRACT: LINK INFORMATION
1212
TRANSACTION STATUS: INTERMEDIATE TRANSFER
OWNER: AGENT C1
AMOUNT: 10 kWh
CONTRACT: LINK INFORMATION
1213
TRANSACTION STATUS: CONSUME
OWNER: CONSUMER D
AMOUNT: 10 kWh
PURCHASE 15 Yen/kWh
DATA ON CONTRACT
RATIO: 50%
1221
PRICE: 15 Yen/kWh
1222

PRODUCER A
3
POWER GENERATION SYSTEM
5a
PRODUCER SYSTEM
7a
PRODUCER NODE
AGENT C1
5c1
INTERMEDIARY AGENT SYSTEM
7c1
INTERMED-IARY NODE
AGENT C2
5c2
INTERMEDIARY AGENT SYSTEM
7c2
INTERMED-IARY NODE
CONSUMER D
5d
CONSUMER SYSTEM
7d
CONSUMER NODE
S71
CALCULATE SURPLUS POWER
S72
RECORD DATA ON POWER AND CONTRACT
S73
SHARE DATA
S74
SHARE DATA
S75
SHARE DATA

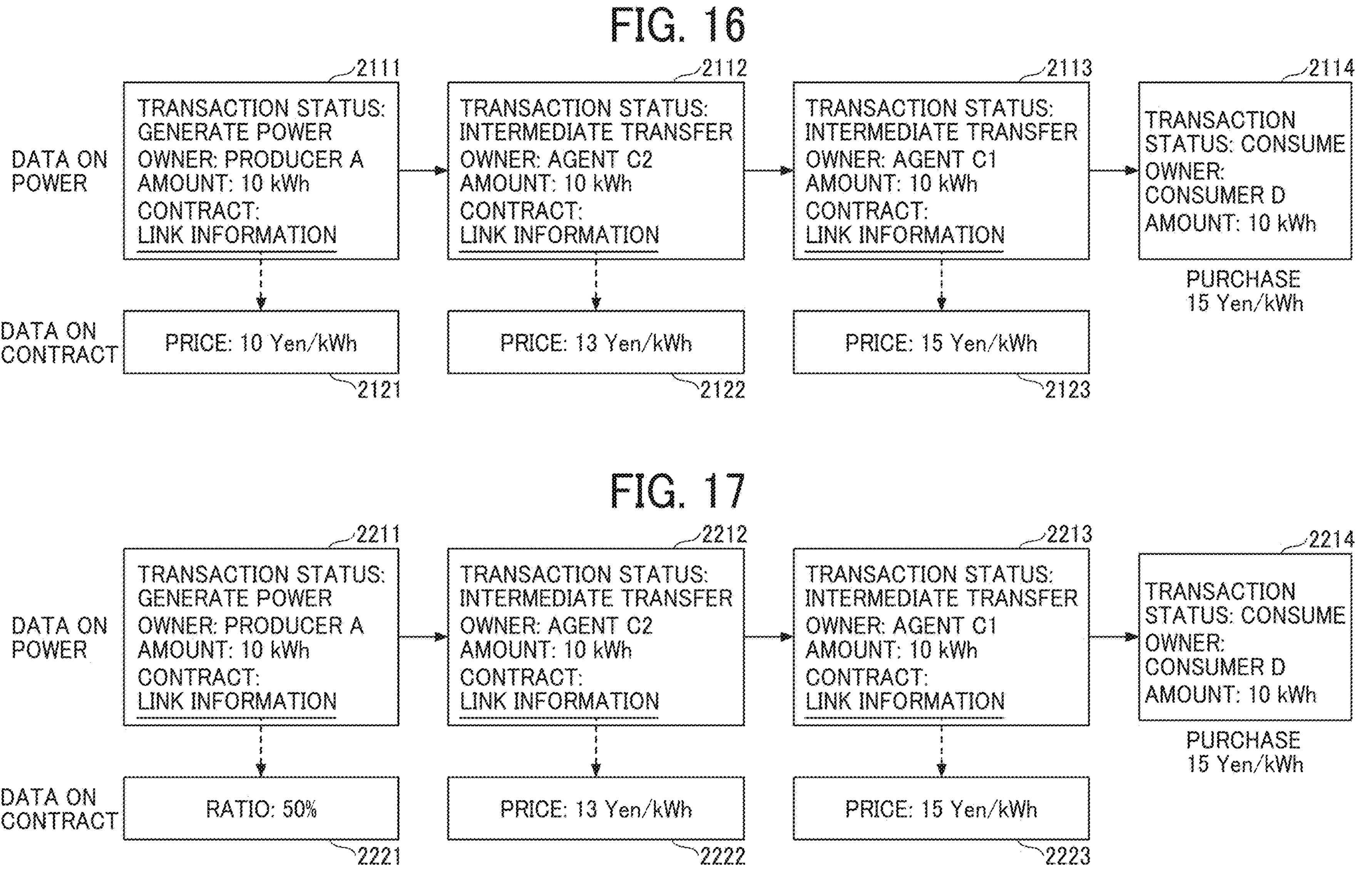
FIG. 16
DATA ON POWER
DATA ON CONTRACT
2111
TRANSACTION STATUS: GENERATE POWER
OWNER: PRODUCER A
AMOUNT: 10 kWh
CONTRACT: LINK INFORMATION
2121
PRICE: 10 Yen/kWh
2112
TRANSACTION STATUS: INTERMEDIATE TRANSFER
OWNER: AGENT C2
AMOUNT: 10 kWh
CONTRACT: LINK INFORMATION
2122
PRICE: 13 Yen/kWh
2113
TRANSACTION STATUS: INTERMEDIATE TRANSFER
OWNER: AGENT C1
AMOUNT: 10 kWh
CONTRACT: LINK INFORMATION
2123
PRICE: 15 Yen/kWh
2114
TRANSACTION STATUS: CONSUME
OWNER: CONSUMER D
AMOUNT: 10 kWh
PURCHASE 15 Yen/kWh
FIG. 17
DATA ON POWER
DATA ON CONTRACT
2211
TRANSACTION STATUS: GENERATE POWER
OWNER: PRODUCER A
AMOUNT: 10 kWh
CONTRACT: LINK INFORMATION
2221
RATIO: 50%
2212
TRANSACTION STATUS: INTERMEDIATE TRANSFER
OWNER: AGENT C2
AMOUNT: 10 kWh
CONTRACT: LINK INFORMATION
2222
PRICE: 13 Yen/kWh
2213
TRANSACTION STATUS: INTERMEDIATE TRANSFER
OWNER: AGENT C1
AMOUNT: 10 kWh
CONTRACT: LINK INFORMATION
2223
PRICE: 15 Yen/kWh
2214
TRANSACTION STATUS: CONSUME
OWNER: CONSUMER D
AMOUNT: 10 kWh
PURCHASE 15 Yen/kWh PRODUCER A
3
POWER GENERATION SYSTEM
5a
PRODUCER SYSTEM
7a
PRODUCER NODE
AGENT C1
5c1
INTERMEDIARY AGENT SYSTEM
7c1
INTERMED-IARY NODE
POWER STORAGE OPERATOR S2
5f2
STORAGE BATTERY SYSTEM
7f2
BATTERY NODE
CONSUMER D
5d
CONSUMER SYSTEM
7d
CONSUMER NODE
POWER GENERATION
S111
RECORD DATA ON POWER AND CONTRACT
S112
SHARE DATA
S113
SHARE DATA
S114
SHARE DATA
S115

PRODUCER A
POWER GENERATION SYSTEM
3
PRODUCER SYSTEM
5a
PRODUCER NODE
7a
AGENT C1
INTERMEDIARY AGENT SYSTEM
5c1
INTERMED-IARY NODE
7c1
POWER STORAGE OPERATOR S2
STORAGE BATTERY SYSTEM
5f2
BATTERY NODE
7f2
CONSUMER D
CONSUMER SYSTEM
5d
CONSUMER NODE
7d
S121
CALCULATE SURPLUS POWER
S122
RECORD DATA ON POWER AND CONTRACT
S123
SHARE DATA
S124
SHARE DATA
S125
SHARE DATA

PRODUCER A
PRODUCER SYSTEM
5a
3
POWER GENERATION SYSTEM
7a
PRODUCER NODE
AGENT C1
INTERMEDIARY AGENT SYSTEM
5c1
7c1
INTERMED-IARY NODE
POWER STORAGE OPERATOR S2
STORAGE BATTERY SYSTEM
5f2
7f2
BATTERY NODE
CONSUMER D
CONSUMER SYSTEM
5d
7d
CONSUMER NODE
S131
CALCULATE POWER SHORTAGE
REQUEST DISCHARGE
S132
RECORD DATA ON POWER AND CONTRACT
S133
SHARE DATA
S134
SHARE DATA
S135
SHARE DATA
S136

PRODUCER A
3
POWER GENERATION SYSTEM
5a
PRODUCER SYSTEM
7a
PRODUCER NODE
AGENT C1
INTERMEDIARY AGENT SYSTEM
5c1
7c1
INTERMED-IARY NODE
POWER STORAGE OPERATOR S2
STORAGE BATTERY SYSTEM
5f2
7f2
BATTERY NODE
CONSUMER D
CONSUMER SYSTEM
5d
7d
CONSUMER NODE
RECORD DATA ON POWER
S151
S152
S153
S154
SHARE DATA
SHARE DATA
SHARE DATA

FIG. 23

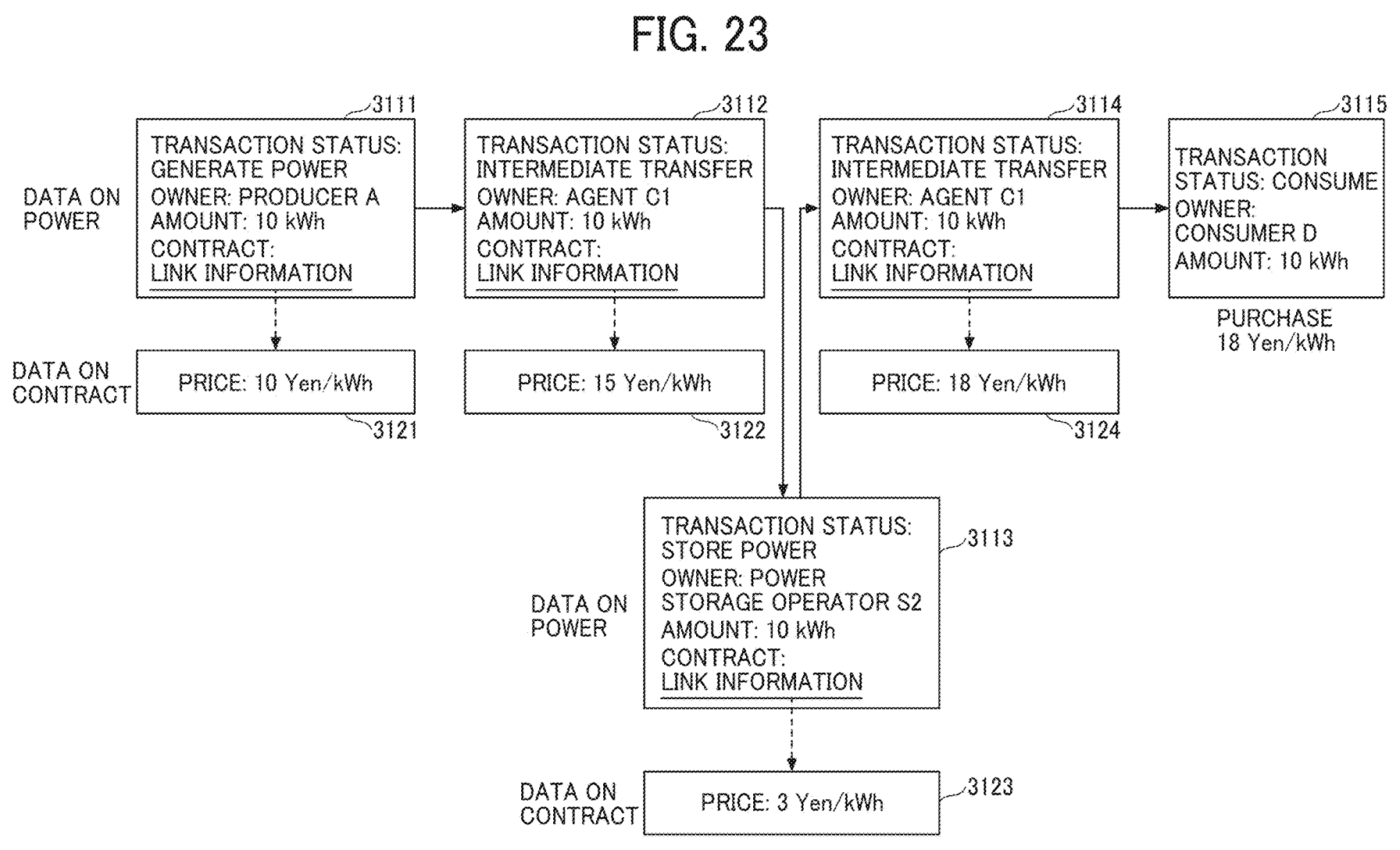

DATA ON POWER
DATA ON CONTRACT

3111
TRANSACTION STATUS: GENERATE POWER
OWNER: PRODUCER A
AMOUNT: 10 kWh
CONTRACT: LINK INFORMATION

3121
PRICE: 10 Yen/kWh

3112
TRANSACTION STATUS: INTERMEDIATE TRANSFER
OWNER: AGENT C1
AMOUNT: 10 kWh
CONTRACT: LINK INFORMATION

3122
PRICE: 15 Yen/kWh

3114
TRANSACTION STATUS: INTERMEDIATE TRANSFER
OWNER: AGENT C1
AMOUNT: 10 kWh
CONTRACT: LINK INFORMATION

3124
PRICE: 18 Yen/kWh

3115
TRANSACTION STATUS: CONSUME
OWNER: CONSUMER D
AMOUNT: 10 kWh

PURCHASE
18 Yen/kWh

DATA ON POWER

3113
TRANSACTION STATUS: STORE POWER
OWNER: POWER STORAGE OPERATOR S2
AMOUNT: 10 kWh
CONTRACT: LINK INFORMATION

DATA ON CONTRACT

3123
PRICE: 3 Yen/kWh

FIG. 24

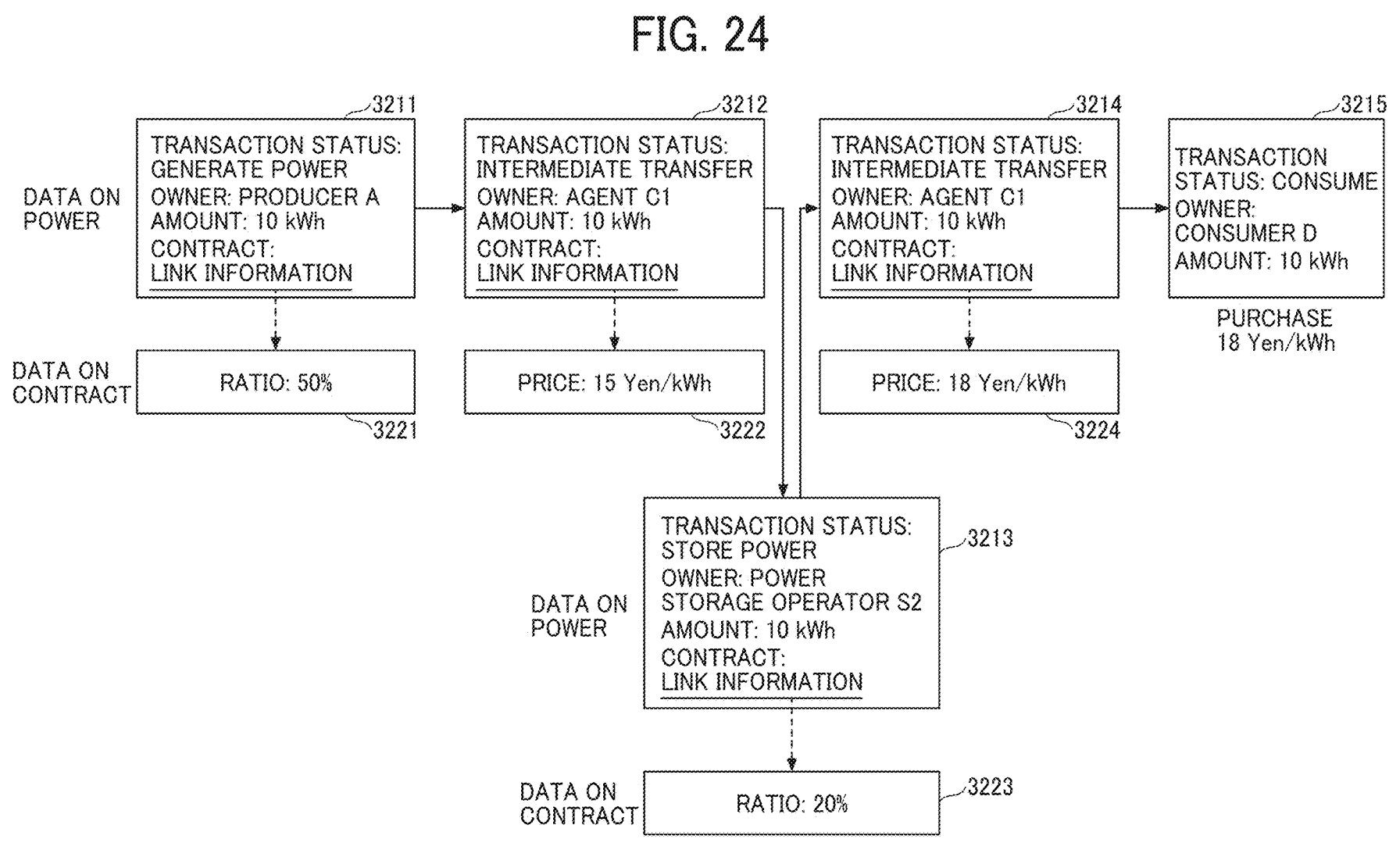

DATA ON POWER

3211
TRANSACTION STATUS: GENERATE POWER
OWNER: PRODUCER A
AMOUNT: 10 kWh
CONTRACT: LINK INFORMATION

DATA ON CONTRACT

3221
RATIO: 50%

3212
TRANSACTION STATUS: INTERMEDIATE TRANSFER
OWNER: AGENT C1
AMOUNT: 10 kWh
CONTRACT: LINK INFORMATION

3222
PRICE: 15 Yen/kWh

3213
TRANSACTION STATUS: STORE POWER
OWNER: POWER STORAGE OPERATOR S2
AMOUNT: 10 kWh
CONTRACT: LINK INFORMATION

DATA ON POWER

3223
RATIO: 20%

DATA ON CONTRACT

3214
TRANSACTION STATUS: INTERMEDIATE TRANSFER
OWNER: AGENT C1
AMOUNT: 10 kWh
CONTRACT: LINK INFORMATION

3224
PRICE: 18 Yen/kWh

3215
TRANSACTION STATUS: CONSUME
OWNER: CONSUMER D
AMOUNT: 10 kWh

PURCHASE
18 Yen/kWh

NODE AND METHOD FOR SHARING DATA

CROSS-REFERENCE TO RELATED APPLICATION

This patent application is based on and claims priority pursuant to 35 U.S.C. § 119(a) to Japanese Patent Application No. 2022-212032, filed on Dec. 28, 2022, in the Japan Patent Office, the entire disclosure of which is hereby incorporated by reference herein.

BACKGROUND

Technical Field

The present disclosure relates to a node and a method for sharing data.

Related Art

In recent years, electricity produced from renewable energy (referred to as "green power" in Japan) has been attracting attention. This electricity is produced from a subset of renewable resources, which are renewable energy, such as solar light, solar heat, wind power, biomass, geothermal power, hydropower, and heat in the atmosphere. Compared to the case where the fossil fuel such as oil, coal, and liquefied natural gas is used to produce electricity, production of electricity using renewable energy emits almost no $CO_2$, which is a cause of global warming. In other words, renewable energy is an energy resource that is environmentally friendly, from among various energy resources used for producing electricity. By operating facilities such as factories using the above-described green power, which is environmentally friendly, companies can increase brand credibility. There is a method for using a blockchain technology to track transactions of electricity produced from renewable energy. The blockchain is one form of a distributed ledger. With a plurality of nodes (computers), a plurality of ledgers indicating transaction histories of assets such as electricity are associated with each other, thus preventing falsification of transaction history data.

SUMMARY

Example embodiments include a node on a blockchain network, including: a memory that stores asset related data including information on an owner of an asset, and contract related data including a transaction price of the asset or a ratio corresponding to the transaction price of the asset; and circuitry that transmits the asset related data and the contract related data to one or more other nodes on the blockchain network to share the asset related data and the contract related data.

Example embodiments include a method for sharing data, performed by a node on a blockchain network, the method including: storing, in a memory, asset related data including information on an owner of an asset, and contract related data including a transaction price of the asset or a ratio corresponding to the transaction price of the asset; and transmitting the asset related data and the contract related data to one or more other nodes on the blockchain network to share the asset related data and the contract related data.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a schematic diagram illustrating a transaction system according to an embodiment;

FIG. 3 is a diagram illustrating a functional configuration of the transaction system of FIG. 1, according to the embodiment;

FIG. 4 is a table illustrating a data structure of data related to electric power ("power related data"), according to an embodiment;

FIG. 5 is a table illustrating a data structure of data related to surplus power ("surplus power related data") according to an embodiment;

FIG. 6 is a table illustrating a data structure of data related to power shortage ("power shortage related data"), according to an embodiment;

FIG. 7 is a table illustrating a data structure of data related to contracts ("contract related data"), according to an embodiment;

FIG. 8 is a sequence diagram illustrating processing or operation of sharing data related to produced power and data related to contracts on the blockchain network, which is performed in relation to the first pattern of processing or operation, according to an embodiment;

FIG. 11 is a diagram illustrating a data structure of the power related data and the contract related data in a simplified form, when the stacking model is applied, according to an embodiment;

FIG. 12 is a diagram illustrating a data structure of the power related data and the contract related data in a simplified form, when the ratio model is applied, according to an embodiment;

FIG. 16 is a diagram illustrating a data structure of the power related data and the contract related data in a simplified form, when the stacking model is applied, according to an embodiment;

FIG. 17 is a diagram illustrating a data structure of the power related data and the contract related data in a simplified form, when the ratio model is applied, according to an embodiment;

FIG. 23 is a diagram illustrating a data structure of the power related data and the contract related data in a simplified form, when the stacking model is applied, according to an embodiment: and FIG. 24 is a diagram illustrating a data structure of the power related data and the contract related data in a simplified form, when the ratio model is applied, according to an embodiment.

Figure 2:
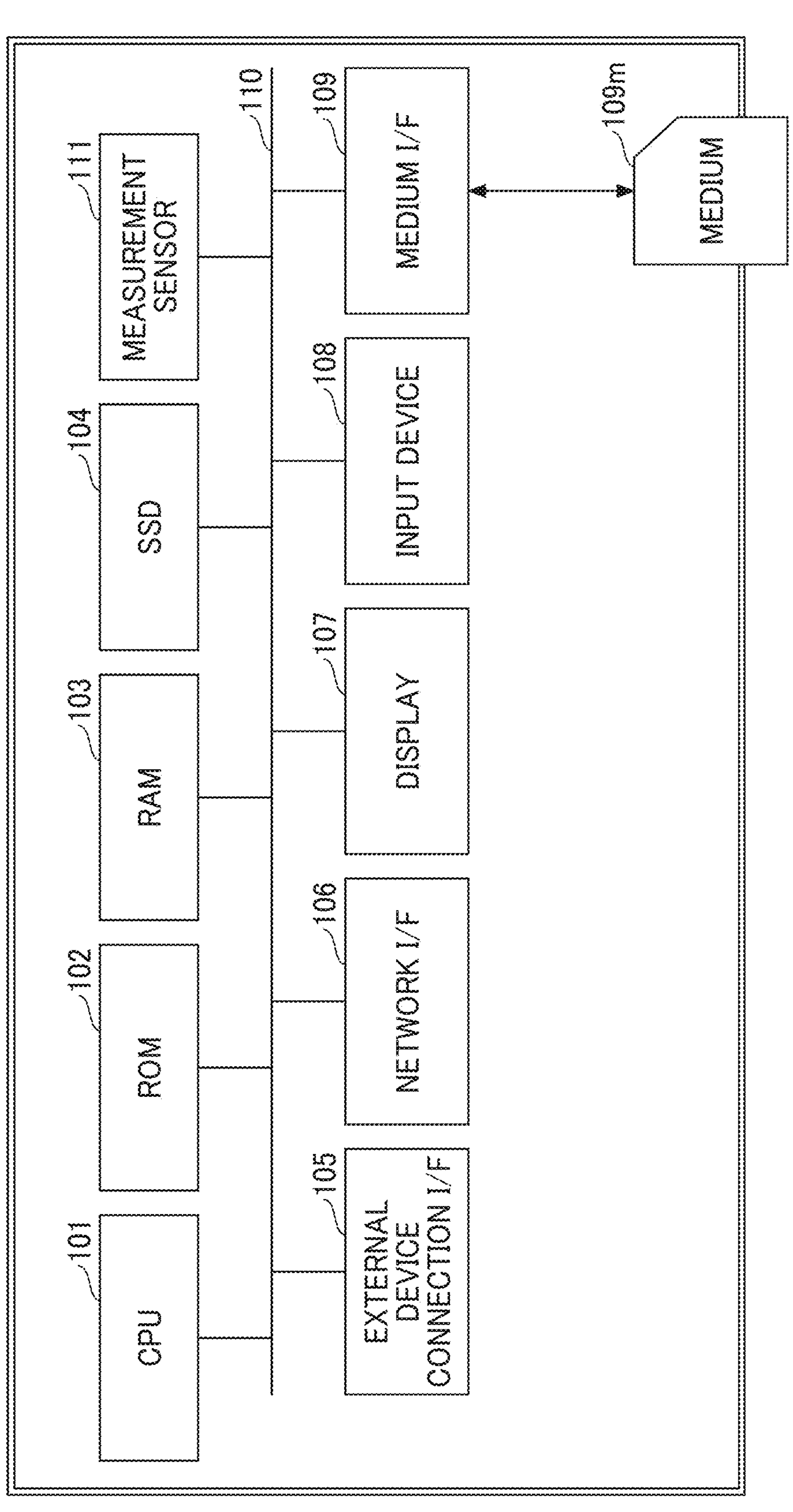
FIG. 2 is a diagram illustrating a hardware configuration of each system and each node in the transaction system of FIG. 1, with electrical connections, according to the embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liberalization process called "electricity market liberalization" has been recently introduced. This allowed various types of electricity retailers, called "new electricity retailers", to enter the retail electricity market. Many of such new electricity retailers do not have means to procure electricity by themselves, and often procure electricity by, for example, purchasing only electricity in an amount based on a consumption predicted by the Japan Electric Power Exchange (JEPX).

Moreover, with the global trend towards decarbonization, the Act on Sophisticated Methods of Energy Supply Structures in Japan requires all electricity retailers to procure at least 44% of their electricity from non-carbon power generation (such as renewable energy) by 2030. With this trend, there is an increasing need for many electricity retailers to secure their own means to procure renewable energy, for example, by having their own power supply of renewable energy such as solar light.

Furthermore, electricity is not produced from renewable energy under a certain condition. For example, electricity is not produced from solar light at night, or electricity is not produced from wind power when there is no wind. For this reason, the price of electricity produced from renewable energy is not necessarily constant.

As described above, flexibility and diversity in electric power supply are enhanced, causing the transaction price of electric power to fluctuate.

In view of the above, there is an increasing need for a system capable of accurately tracking (tracing) the transaction price of electric power.

Embodiments of the present disclosure are described in detail below, with reference to the drawings.

Overview of System Configuration

First, overview of a configuration of a transaction system 1 is described according to an embodiment. FIG. 1 is a schematic view of the transaction system 1 according to the present embodiment. In the following embodiments of the present disclosure, the case in which electricity is used as an example of an asset is described.

Explanation on Entities

As illustrated in FIG. 1, the transaction system 1 includes a producer A of electricity, a transaction market B of electricity, an intermediary agent C of electricity, a consumer D of electricity, power storage operators S1 to S3 of electricity, and a certification authority E. The producer A, the transaction market B, the intermediary agent C, the consumer D, and the power storage operators S1 to S3 perform transactions of electric power using a blockchain network 100, which is an example of a common data infrastructure. The "blockchain" is one form of a distributed ledger. With a plurality of nodes (computers), a plurality of ledgers indicating transaction histories of assets such as electricity are associated with each other, as one chain in a chorological order from the past, while using cryptographic technology. The blockchain prevents falsification of transaction history data, thus keeping the transaction history data accurate. The "blockchain network" is a communication network on which the plurality of nodes (computers) using the blockchain reside.

A system operator, who manages the blockchain network 100, requests entities such as companies (the producer A, the transaction market B, the intermediary agent C, the consumer D, and the power storage operators S1 to S3) to register in the transaction system 1, and issues a digital certificate to each entity that has registered. The blockchain network 100 is provided with an application programming interface (API), which allows a user, such as the system operator, to record or read data regarding interchange or transactions of electric power between various companies. Examples of such data include, data related to electric power, and data related to a contract (or contracts), which will be described later. The standard API allows the user, such as the system operator of various companies, to generate a ledger on the blockchain network 100, and access the blockchain network 100.

In operation, electricity produced by the producer A is distributed from the producer A to the consumer D via a transmission and distribution network, constructed by, for example, substations and transmission lines. The transaction market B or the intermediary agent C manages the transactions or transfers of ownership of electricity (electric power) between the producer A and the consumer D.

The producer A, an example of a supplier, is an entity that produces electricity from solar light, which is one example of renewable energy resource for producing electricity, and is referred to as "green power" in Japan. Other examples of the producer A may include an entity that produces electricity from petroleum as an example of fossil fuel. However, in the present embodiment, it is assumed that at least one producer A produces electricity from renewable energy.

The transaction market B is an institution for exchanging (the ownership of) the electricity produced by the producer A.

The intermediary agent C is an entity that intermediates the transfer of ownership of electricity (or electric power) between different entities. In the following, the transfer of ownership of electricity may be referred to as transaction of electric power. The intermediary agent C buys (makes an order of) electric power from the transaction market B. The transaction market B sells electric power to the intermediary agent C. Further, the intermediary agent C can directly make a transaction of electric power with the producer A without intervening in the transaction market B. In the present embodiment, two intermediary agents C1 and C2 are present. The ownership of electricity may be transferred between the intermediary agent C1 and the intermediary agent C2, or only transferred from one of the intermediary agents C1 and C2 to the other.

The consumer D is an example of a user, and makes an order of electric power to the intermediary agent C. The intermediary agent C sells electric power to the consumer D. In the case the asset is not consumed like electricity, such as in the case of a real estate property, the user may be an owner who currently owns the asset. With the production method certificate, the consumer D can apply for public subsidy, based on the renewable energy usage ratio (or $CO_2$ reduction rate) of the consumer D, or total usage of renewable energy of the consumer D.

The power storage operators S1, S2, and S3 are business operators, such as companies, which temporarily store electric power at any time in the transactions of electric power. The power storage operators S1 to S3 are collectively referred to as the "power storage operator S". Any other entity, such as the intermediary agent C, may also act as the power storage operator S. The power storage operators S1, S2, and S3 may be the same entity.

The certification authority E monitors transactions (for example, on the blockchain network 100) to ensure that the electric power in the transaction is electric power produced from renewable energy. Specifically, the certification authority E is a public institution such as a national or local public entity that monitors a type of production method of asset (for example, a specific type of production method). Example types of production method of electricity include a production method using solar light or solar heat, a production method using wind power, a production method using biomass, a production method using geothermal power, a production method using hydroelectric resources, a production method using heat in the atmosphere, and a production method using nuclear power. Of those various types of production methods of electricity, the production methods of electricity using, for example, solar light, solar heat, wind power, biomass, geothermal power, hydropower, and heat in the atmosphere are grouped into a production method using renewable energy. The production methods of electricity using petroleum, coal, and liquefied natural gas are grouped into a production method using fossil fuel. Compared to the production method using fossil fuel, the production method using renewable energy emits almost no $CO_2$, which is a cause of global warming. In other words, renewable energy is an energy resource that is environmentally friendly. In this disclosure, as examples of renewable energy resource, solar light or heat, wind power, biomass, geothermal power, hydropower, and heat in the atmosphere are used. Further, as examples of fossil fuel, oil, coal, and liquefied natural gas are used.

If the certification authority E finds any fraud in data written through monitoring the blockchain network 100, the certification authority E gives a penalty such as revocation of a certificate to an entity (for example, a company) that has written such data, such that integrity of the data on the blockchain network 100 is retained. Based on the decentralized system of the blockchain network 100, even if any node drops (drops out of sync), the blockchain network 100 still operates as long as there are other nodes. Since the other entities (companies) maintain the system including a producer system 5*a*, business can be continued as usual to allow transactions of electric power. Further, since information on revocation is shared between the nodes on the blockchain network 100, each entity (company) is able to know a range of influence of such revocation. The node is an information processing apparatus, such as a computer, which resides on the blockchain network 100.

There may be multiple producers A, transaction markets B, consumers D, or certificate authorities E. Further, there may be three or more intermediary agents C. The number of the power storage operators S may be two or four or more.

Overview of Configuration of Transaction System

Referring to FIG. 1, the overall configuration of the transaction system 1 is described according to the present embodiment. Each of the nodes in the transaction system 1 authenticates an access to each node by checking a digital certificate of a registered entity (company), and allows each node to record or read data on the blockchain.

The producer A owns or manages the producer system 5*a* and a producer node 7*a*. The producer system 5*a* acquires power generation information indicating an amount of power generated from a power generation system 3 to be described later. The producer system 5*a* is authorized to access the producer node 7*a*.

The transaction market B owns or manages a transaction market system ("market system") 5*b* and a transaction market node ("market node") 7*b*. The transaction market system 5*b* is authorized to access the transaction market node 7*b*.

The intermediary agent C1 owns or manages an intermediary system 5*c*1 and an intermediary node 7*c*1. The intermediary agent C2 owns or manages an intermediary system 5*c*2 and an intermediary node 7*c*2. The intermediary systems 5*c*1 and 5*c*2 are authorized to access the intermediary nodes 7*c*1 and 7*c*2, respectively.

The consumer D owns or manages a consumer system 5*d* and a consumer node 7*d*. The consumer system 5*d* is authorized to access the consumer node 7*d*.

The certification authority E owns or manages a certification authority (CA) system 5*e*. The certification authority system 5*e* accesses the blockchain network 100 and checks whether or not electric power in the transaction has been produced from renewable energy.

The power storage operators S1 to S3 own or manage the storage battery systems **5*f*1, 5*f*2, and 5*f*3, respectively. The storage battery systems 5*f*1, 5*f*2, and 5*f*3 are authorized to access the storage battery nodes 7*f*1, 7*f*2, and 7*f*3, respectively. The producer A can charge electric power to the storage battery system 5*f*1 or can discharge electric power from the storage battery system 5*f*1. The intermediary agent C can charge electric power to the storage battery system 5*f*2 or can discharge electric power from the storage battery system 5*f*2. Further, the electric power may be charged or discharged from one of the storage battery systems 5*f*1 and 5*f*2 to the other one of the storage battery systems 5*f*1 and 5*f*2. The consumer D can charge electric power to the storage battery system 5*f*3 or can discharge electric power from the storage battery system 5*f*3**.

The producer system 5*a*, the transaction market system 5*b*, the intermediary systems 5*c*1 and 5*c*2, the consumer system 5*d*, the certification authority system 5*e*, and the storage battery systems **5*f*1, 5*f*2, and 5*f*3 are collectively referred to as a "system 5". The producer node 7***a*, the transaction market node 7*b*, the intermediary nodes 7*c*1 and 7*c*2, the consumer node 7*d*, and the storage battery nodes **7*f*1, 7*f*2, and 7*f*3 are collectively referred to as a "node 7". The blockchain network 100 is constructed by a plurality of nodes including the nodes 7 illustrated in FIG. 1**.

Hardware Configuration of System and Node

Referring now to FIG. 2, a hardware configuration of each of the system 5 and the node 7 is described, according to the present embodiment. FIG. 2 is a diagram illustrating a hardware configuration of each of the system 5 and the node 7 illustrated in FIG. 1.

In particular, FIG. 2 is a diagram illustrating a hardware configuration of each of the system 5 and node 7, with electrical connections, according to the embodiment.

As illustrated in FIG. 2, the system 5 and the node 7 are each implemented by a computer, which includes a central processing unit (CPU) 101, a read only memory (ROM) 102, a random access memory (RAM) 103, a solid state drive (SSD) 104, an external device connection interface (I/F) 105, a network I/F 106, a display 107, an input device 108, a medium I/F 109, and a bus line 110.

The CPU 101, which is a processor, controls entire operation of the information processing apparatus 10. The ROM 102 stores a program for booting the CPU 101 such as an initial program loader (IPL). The RAM 103 is used as a work area for the CPU 101.

The SSD 104 reads or writes various types of data therein under control of the CPU 101. Any memory such as a hard disk drive (HDD) may be used instead of the SSD 104.

The external device connection I/F 105 is an interface that connects the computer to various external devices. Examples of the external devices include a display, a speaker, a keyboard, a mouse, a universal serial bus (USB) memory, and a printer.

The network I/F 106 is an interface that communicates data via a communication network such as the Internet, such as a network interface circuit.

The display 107 is an example of display means that displays various images, such as a liquid crystal display (LCD) and an organic electroluminescence (EL) display.

The input device 908 is an example of input means that allows a user to select or execute various instructions, select a target for processing, or move a cursor. Examples of the input device 908 include a pointing device such as a stylus pen and a touch panel.

The medium I/F 109 controls reading and writing (storing) of data from and to a recording medium 109*m* such as a flash memory. Examples of the recording medium 109*m* include a DVD and a BLU-RAY DISC.

The bus line 110 is, for example, an address bus or a data bus, which electrically connects the elements, such as the CPU 101 illustrated in FIG. 2, to each other.

In addition to the elements illustrated in FIG. 2, the power generation system 3 to be described later further includes a measurement sensor 111 that measures an amount of electric power that is generated. Similarly, the consumer system 5*d* further includes a measurement sensor 111 that measures an amount of electric power that is consumed in addition to the elements illustrated in FIG. 2.

Functional Units of Transaction System

Referring now to FIG. 3, a functional configuration of the transaction system 1 is described according to the present embodiment. Since the transaction market system 5*b* and the certification authority system 5*e* have the same functional configuration as that of the producer system 5*a*, description thereof will be omitted.

Power Generation System

As illustrated in FIG. 3, the power generation system 3 is implemented by, for example, a smart meter, and includes a transmission and reception unit 31 and a measurement unit 33. These units are functions implemented by or caused to function by operating any of the hardware elements illustrated in FIG. 2 in cooperation with the instructions of the CPU 101 according to the control program expanded from the SSD 104 to the RAM 103.

The transmission and reception unit 31, which is implemented by the network I/F 106 that operates under control of the CPU 101, performs data communication with another apparatus (system).

The measurement unit 33, which is implemented by the measurement sensor 111, measures an amount of power generated by the power generation facility at regular time intervals (for example, every 30 minutes).

Producer System

As illustrated in FIG. 3, the producer system 5*a* includes a transmission and reception unit 51*a*. The transmission and reception unit 51*a* is a function implemented by or caused to function by operating at least one of the hardware elements illustrated in FIG. 2 in cooperation with the instructions of the CPU 101 according to the control program expanded from the SSD 104 to the RAM 103.

The transmission and reception unit 51*a*, which is implemented by the network I/F 106 that operates under control of the CPU 101, performs data communication with another apparatus (system).

Intermediary System

Intermediary System 5*c*1

As illustrated in FIG. 3, the intermediary system 5*c*1 includes a transmission and reception unit 51*c*1, an adjustment unit 55*c*1, and a calculation unit 57*c*1. These units are functions implemented by or caused to function by operating any of the hardware elements illustrated in FIG. 2 in cooperation with the instructions of the CPU 101 according to the control program expanded from the SSD 104 to the RAM 103.

The transmission and reception unit 51*c*1, which is implemented by the network I/F 106 that operates under control of the CPU 101, performs data communication with another apparatus (system).

The adjustment unit 55c1 performs supply-demand balance control to allocate electric power, out of the total amount of electric power currently owned by the intermediary agent C1. Specifically, the adjustment unit 55c1 allocates, to the consumer D, electric power having a specific type of production method (production method indicating solar light, wind power, etc.) in a specific amount, in accordance with details of the contract with the consumer D. In other words, the adjustment unit 55c1 allocates a specific asset produced by a specific type of production method, such as electric power produced from renewable energy, to the consumer D, in an amount corresponding to the details of the contract.

The calculation unit 57c1 calculates an amount of power shortage, out of electric power to be supplied to the consumer D by the intermediary agent C1 according to the contract. The calculation unit 57c1 further calculates, of the total amount of electric power currently owned by the intermediary agent C1, an amount of electric power that remains even after the electric power is supplied to the consumer D according to the contract.

Intermediary System 5c2

As illustrated in FIG. 3, the intermediary system 5c2 includes a transmission and reception unit 51c2, an adjustment unit 55c2, and a calculation unit 57c2. These units are functions implemented by or caused to function by operating any of the hardware elements illustrated in FIG. 2 in cooperation with the instructions of the CPU 101 according to the control program expanded from the SSD 104 to the RAM 103.

The transmission and reception unit 51c2, which is implemented by the network I/F 106 that operates under control of the CPU 101, performs data communication with another apparatus (system).

The adjustment unit 55c2 performs supply-demand balance control to allocate electric power, out of the total amount of electric power currently owned by the intermediary agent C2. Specifically, the adjustment unit 55c2 allocates, to the consumer D, electric power having a specific type of production method (production method indicating solar light, wind power, etc.) in a specific amount, in accordance with details of the contract with the consumer D.

The calculation unit 57c2 calculates an amount of power shortage, out of electric power to be supplied to the consumer D by the intermediary agent C2 according to the contract. The calculation unit 57c2 further calculates, of the total amount of electric power currently owned by the intermediary agent C2, an amount of electric power that remains even after the electric power is supplied to the consumer D according to the contract.

Storage Battery System

As illustrated in FIG. 3, the storage battery system 5f2 includes a transmission and reception unit 51f2 and a measurement unit 53f2. These units are functions implemented by or caused to function by operating any of the hardware elements illustrated in FIG. 2 in cooperation with the instructions of the CPU 101 according to the control program expanded from the SSD 104 to the RAM 103.

The transmission and reception unit 51f2, which is implemented by the network I/F 106 that operates under control of the CPU 101, performs data communication with another apparatus (system).

The measurement unit 53f2, which is implemented by the measurement sensor 111, measures the amount of electric power charged in the storage battery system 5f2 or the amount of electric power discharged from the storage battery system 5f2.

In FIG. 3, of the three storage battery systems 5f1, 5f2, and 5f3 illustrated in FIG. 1, only the storage battery system 5f1, which will be described in the description below, is illustrated. The transaction system 1 of FIG. 3 also includes the other storage battery systems 5f2 and 5f3.

Consumer System

As illustrated in FIG. 3, the consumer system 5d is implemented by a smart meter, for example, and includes a transmission and reception unit 51d and a measurement unit 53d. These units are functions implemented by or caused to function by operating any of the hardware elements illustrated in FIG. 2 in cooperation with the instructions of the CPU 101 according to the control program expanded from the SSD 104 to the RAM 103.

The transmission and reception unit 51d, which is implemented by the network I/F 106 that operates under control of the CPU 101, performs data communication with another apparatus (system).

The measurement unit 53d, which is implemented by the measurement sensor 111, measures an amount of power consumed by an electric device at regular time intervals (for example, every 30 minutes).

Node

The functional configuration of each node is described below according to the present embodiment.

The producer node 7a includes a transmission and reception unit 71a and a storing and reading unit 78a. The producer node 7a further includes a storage unit (storage) 79a, implemented by the ROM 102, RAM 103, or SSD 104 illustrated in FIG. 2.

The transmission and reception unit 71d, which is implemented by the network I/F 106 that operates under control of the CPU 101, performs data communication with another apparatus (system).

The storing and reading unit 78a, which is implemented by instructions of the CPU 101, stores various data (or information) in the storage unit 79a and reads various data (or information) from the storage unit 79a.

The intermediary node 7c1, the intermediary node 7c2, the consumer node 7d, and the storage battery node 7f2 include transmission and reception units 71c1, 71c2, 71d, and 71f2, respectively, each of which has the same functions as those of the transmission and reception unit 71d, and thus the description thereof is omitted. The intermediary node 7c1, the intermediary node 7c2, the consumer node 7d, and the storage battery node 7f2 include storage and reading units 78c1, 78c2, 78d, and 78f2, respectively, each of which has the same functions as those of the storage and reading unit 78a, and thus the description thereof is omitted. The intermediary node 7c1, the intermediary node 7c2, the consumer node 7d, and the storage battery node 7f2 include the storage units 79c1, 79c2, 79d, and 79f2, respectively, each of which has the same functions as those of the storage unit 79a, and thus description thereof is omitted. The storage unit 79a is implemented by the ROM 102, RAM 103, or SSD 104 illustrated in FIG. 2.

Shared Data

Referring to FIGS. 4 to 7, a data structure of data shared between the producer A, the transaction market B, the intermediary agent C, the consumer D, and the power storage operator S will be described below according to the present embodiment. The data items illustrated in FIGS. 4 to 6 are stored in a public area of storage areas on the blockchain network 100, such that these data items are accessible by any one of the producer A, the transaction market B, the intermediary agent C, the consumer D, and the power storage operator S. On the other hand, the data items illustrated in FIG. 7 are stored in a private area of the storage areas on the blockchain network 100, such that these data items are accessible by entities involved in a specific transaction of electric power, among the producer A, the transaction market B, the intermediary agent C, the consumer D, and the power storage operators S1 to S3. For example, data on a price of electric power sold by the producer A to the intermediary agent C is accessible only by the producer A and the intermediary agent C having an access right, so that such data is not disclosed to any other entity (the transaction market B, the consumers D, and the power storage operators S1 to S3).

Data Related to Electric Power

FIG. 4 is a diagram illustrating a data structure of data related to electric power ("power related data"), according to the present embodiment. As illustrated in FIG. 4, the power related data includes a field indicating a data structure type in the blockchain, a unique data ID of the power related data in the blockchain, a transaction status (produce or generate power, transfer or sell, charge, discharge, use or consume, etc.), a production method type (classification such as solar light, wind power, etc.), a flag indicating whether or not the electric power is produced from renewable energy, a date and time of production of the electric power, an amount of the electric power, link information of storage location of contract related data, a generator (producer) of the electric power, a current owner of the electric power, a previous owner of the electric power, a data ID of the "parent" power related data when dividing the power related data, a data ID of "child" power related data when dividing the power related data, and an extended attribute. For example, in the case where 10 kWh of electric power is produced, if the intermediary agent C1 sells (intermediates transfer) 6 kWh of electric power to the consumer D, the parent power related data indicating 4 kWh (calculated by 10 kWh-6 kWh) of power and the child power related data indicating power of 6 kWh are generated and are managed with respective data IDs being assigned as illustrated in FIG. 4.

Data Related to Electric Power in the Case of Surplus Power

FIG. 5 is a table illustrating a data structure of data related to surplus power ("surplus power related data") according to the present embodiment. As illustrated in FIG. 5, the surplus power related data includes a field indicating a data structure type in the blockchain, a unique data ID of the surplus power related data in the blockchain, a transaction status (produce or generate, sell or transfer, sold or transferred, etc.) of the surplus power, a flag indicating whether or not the surplus power is produced from renewable energy, a date and time of occurrence of the surplus power, a total amount of the surplus power, remaining surplus power, link information of a storage location of contract related data, a creator of the surplus power related data, association with the power related data (association with the record of FIG. 4), and an extended attribute.

The "date and time of occurrence of the surplus power" indicates a date and time when the surplus power occurs at the intermediary agent C. The "total amount of the surplus power" indicates, of the total amount of electric power currently owned by the intermediary agent C, an amount of electric power that remains even after the electric power is supplied to the consumer D according to the contract. The "remaining surplus power" indicates an amount of the surplus power currently remaining in the total amount of surplus power. When the surplus power related data of the intermediary agent C2 is also shared with the intermediary agent C1, the intermediary agent C1 refers to the "flag indicating whether or not the power is produced from renewable energy" and the "remaining surplus power", to have information on electric power (power produced from renewable energy) that can be transferred from the intermediary agent C2.

Data Related to Electric Power in the Case of Power Shortage

FIG. 6 is a table illustrating a data structure of data related to power shortage ("power shortage related data"), according to the present embodiment. As illustrated in FIG. 6, the power shortage related data includes a field indicating a data structure type in the blockchain, a unique data ID of the power shortage related data in the blockchain, a transaction status (register, short, supplied, etc.) of the power shortage, a flag indicating whether or not electric power is produced from renewable energy, a date and time of occurrence of the power shortage, a total amount of the power shortage, remaining power shortage, link information of a storage location of contract related data, a creator of the power shortage related data, association with the power related data (association with the record of FIG. 4), and an extended attribute.

The "date and time of occurrence of the power shortage" indicates a date and time when the power shortage occurs at the intermediary agent C. The "total amount of power shortage" indicates the total amount of power that cannot be supplied due to the shortage, of the total amount of power that the intermediary agent C plans to provide to the consumer D according to the contract. The "remaining power shortage" indicates an amount of the power shortage currently remained in the total amount of the power shortage of the intermediary agent C (for example, the intermediary agent C1), as a result of interchange of power, for example, from another intermediary agent C (for example, the intermediary agent C2).

Data Related to Contracts

FIG. 7 is a table illustrating a data structure of data related to contracts (contract related data), according to the present embodiment. As illustrated in FIG. 7, the contract related data includes a field indicating a data structure type in the blockchain, a unique data ID identifying the contract related data in the blockchain, a price of electric power to be traded, a ratio of electric power corresponding to the price of electric power to be traded, and a data ID identifying a link source. In the table of FIG. 7, a value (numerical value) may not be stored for the price of electric power to be traded or the ratio of electric power corresponding to the price of electric power to be traded.

Processing or Operation of Transaction System

Referring to FIGS. 8 to 24, processing or operation performed by the transaction system 1 is described below according to the present embodiment. Each of the entities such as companies (the producer A, the transaction market B, the intermediary agents C1 and C2, the consumer D, and the power storage operator S2) can store (write) data in the node 7 of its own, once the systems and devices owned by each entity are made applicable to the write standard API. As a result, each entity is able to use the blockchain network 100. For example, in the case of the producer A in FIG. 1, a control panel of the power generation facility is made applicable to the write standard API. The control panel of the power generation facility then allows a user to perform writing operation on the producer node **7*a* via the API. Alternatively, the producer system 5*a* may collect data on the amount of power generated from the power generation facility, and the producer system 5*a* performs writing operation on the producer node 7*a*** via the API.

In the present embodiment, three different patterns of processing are described below: Alternatively, any other pattern of processing may be performed. The processing or operation illustrated in any one of FIGS. 8 to 24, which will be described below, is performed, for example, every 30 minutes per day. In the present embodiment, in order to maintain realtime performance, it is desired to use a mechanism requiring a shorter time for data write (for example, a consortium blockchain network). The plurality of intermediary agents C can check data regarding interchange and transaction of electric power, such that electric power can be interchanged between the plurality of intermediary agents C. Examples of such data include data related to electric power, and data related to contracts. In the present embodiment, realtime performance indicates a processing time that enables smooth transaction of electric power. In Japan, as of 2022, data on electric power is collected every 30 minutes, so that calculation of an amount of power generation or an amount of power consumption, and transaction of electric power are expected to be completed in 30 minutes. In the future, this rule may be revised and definition of the realtime performance may be changed, and the processing time may be shortened to, for example, every 15 minutes.

This realtime performance introduces a new value, which has not been provided by the conventional power management using blockchain.

For example, by visualizing an excess or a shortage of electric power in real time, renewable energy can be interchanged between different entities so as to stabilize the supply-demand balance. As the ledger itself of the blockchain can be used as evidence, credit cost in transactions between entities (companies) can be reduced. The use of blockchain reduces the risk that the entity (company) may encounter by owning renewable energy, so that it would be easier for the entity (company) to own renewable energy. As a result, investment in renewable energy is facilitated in the future.

In the following description, it is assumed that the intermediary agent C obtains electric power directly from the producer A, without intervening in the transaction market B. The processing or operation described referring to any one of FIGS. 8 to 24, which will be described later, is performed every 30 minutes as described above. Practically, however, the intermediary agent (retailer) is required to submit prediction of supply and demand of electric power one day before the actual supply and demand. For this reason, for example, information on an amount of surplus power and an amount of power shortage may be generated based on prediction data of one day before. Then, agreement on the transaction of electric power may be made in advance based on the generated information.

First Pattern of Processing or Operation

Referring to FIGS. 8 to 12, first pattern of processing or operation is described below according to the present embodiment. The first pattern of processing or operation corresponds to a sequence of processes to be performed when the intermediary agent C1 purchases electric power produced by the producer A and sells the electric power to the customer D.

The data related to electric power are stored in the public areas of the storage units 79*a*, 79*c*1, 79*c*2, and 79*d*, and the data related to contracts are stored in the private areas of the storage units 79*a*, 79*c*1, 79*c*2, and 79*d*.

Sharing of Data Related to Produced Electric Power

Referring to FIG. 8, processing to share data related to electric power produced by the producer A and data related to contracts in the blockchain network 100 is described below according to the present embodiment. FIG. 8 is a sequence diagram illustrating processing or operation of sharing data related to produced power and data related to contracts on the blockchain network, performed in relation to the first pattern of processing or operation, according to the present embodiment.

S11: In the power generation system 3, the measurement unit 33 measures an amount of produced power, and the transmission and reception unit 31 transmits power generation information indicating the measured amount of produced power to the producer system 5*a*. The transmission and reception unit 51*a* of the producer system 5*a* receives the power generation information.

S12: The transmission and reception unit 51*a* of the producer system 5*a* transmits, to the producer node 7*a*, power related data including the power generation information, and contract related data including the price of electric power. The transmission and reception unit 71*a* of the producer node 7*a* receives the power related data and the contract related data, and the storing and reading unit 78*a* stores the power related data and the contract related data in the storage unit 79*a*. The right to access the contract related data is assigned only to the producer A and the intermediary agent C1.

S13: The transmission and reception unit 71*a* of the producer node 7*a* transmits the power related data and the contract related data to the intermediary node 7*c*1. The transmission and reception unit 71*c*1 of the intermediary node 7*c*1 receives the power related data and the contract related data, and the storing and reading unit 78*c*1 stores the power related data and the contract related data in the storage unit 79*c*1, such that data is shared.

S14: The transmission and reception unit 71*a* of the producer node 7*a* transmits the power related data and the contract related data to the intermediary node 7*c*2. The transmission and reception unit 71*c*2 of the intermediary node 7*c*2 receives the power related data and the contract related data, and the storing and reading unit 78*c*2 stores the power related data and the contract related data in the storage unit 79*c*2, such that data is shared.

S15: The transmission and reception unit 71*a* of the producer node 7*a* transmits the power related data and the contract related data to the consumer node 7*d*. The transmission and reception unit 71*d* of the consumer node 7*d* receives the power related data and the contract related data, and the storing and reading unit 78*d* stores the power related data and the contract related data in the storage unit 79*d* to share data.

Sharing of Data Related to Transferred Electric Power

Figure 9:
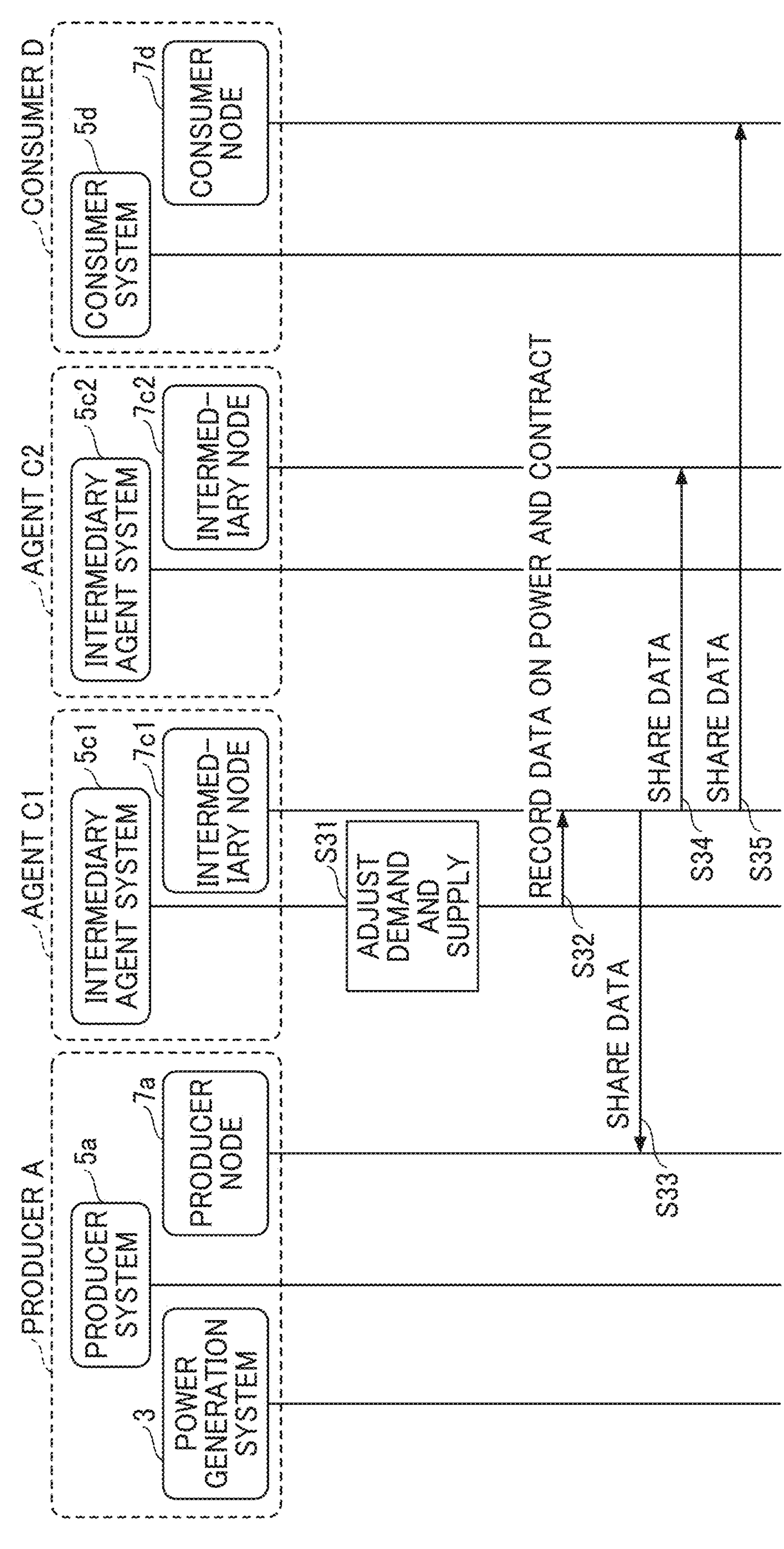
FIG. 9 is a sequence diagram illustrating processing or operation of sharing data related to transferred power and data related to contracts on the blockchain network, which is performed in relation to the first processing of operation, according to an embodiment.

Referring now to FIG. 9, processing to share data related to electric power that the intermediary agent C (for example, the intermediary agent C1) intermediates transfer, and data related to contracts, in the blockchain network is described according to the present embodiment. FIG. 9 is a sequence diagram illustrating processing or operation of sharing data related to transferred power and data related to contracts on the blockchain network, performed in relation to the first pattern of processing or operation, according to the present embodiment.

S31: In the intermediary system 5*c*1, the adjustment unit 55*c*1 performs supply-demand balance control to allocate, to the consumer D, electric power having a specific type of production method (production method indicating solar light, wind power, etc.) in a specific amount, in accordance with details of the contract with the consumer D, of the total amount of current electric power owned by the intermediary agent C1.

S32: In the intermediary system 5c1, the transmission and reception unit 51c1 transmits, to the intermediary node 7c1, data related to electric power having been allocated, and the data related to contract that includes the price of electric power, as a result of the supply-demand balance control by the adjustment unit 55c1. The transmission and reception unit 71c1 of the intermediary node 7c1 receives the power related data and the contract related data, and the storing and reading unit 78c1 stores the power related data and the contract related data in the storage unit 79cl.

S33: The transmission and reception unit 71c1 of the intermediary node 7c1 transmits the power related data and the contract related data to the producer node 7a. The transmission and reception unit 71a of the producer node 7a receives the power related data and the contract related data, and the storing and reading unit 78a stores the power related data and the contract related data in the storage unit 79a to share data.

S34: The transmission and reception unit 71c1 of the intermediary node 7c1 transmits the power related data and the contract related data to the intermediary node 7c2. The transmission and reception unit 71c2 of the intermediary node 7c2 receives the power related data and the contract related data, and the storing and reading unit 78c2 stores the power related data and the contract related data in the storage unit 79c2, such that data is shared.

S35: The transmission and reception unit 71c1 of the intermediary node 7c1 transmits the power related data and the contract related data to the consumer node 7d. The transmission and reception unit 71d of the consumer node 7d receives the power related data and the contract related data, and the storing and reading unit 78d stores the power related data and the contract related data in the storage unit 79d to share data.

Sharing of Data Related to Consumed Electric Power

Figure 10:
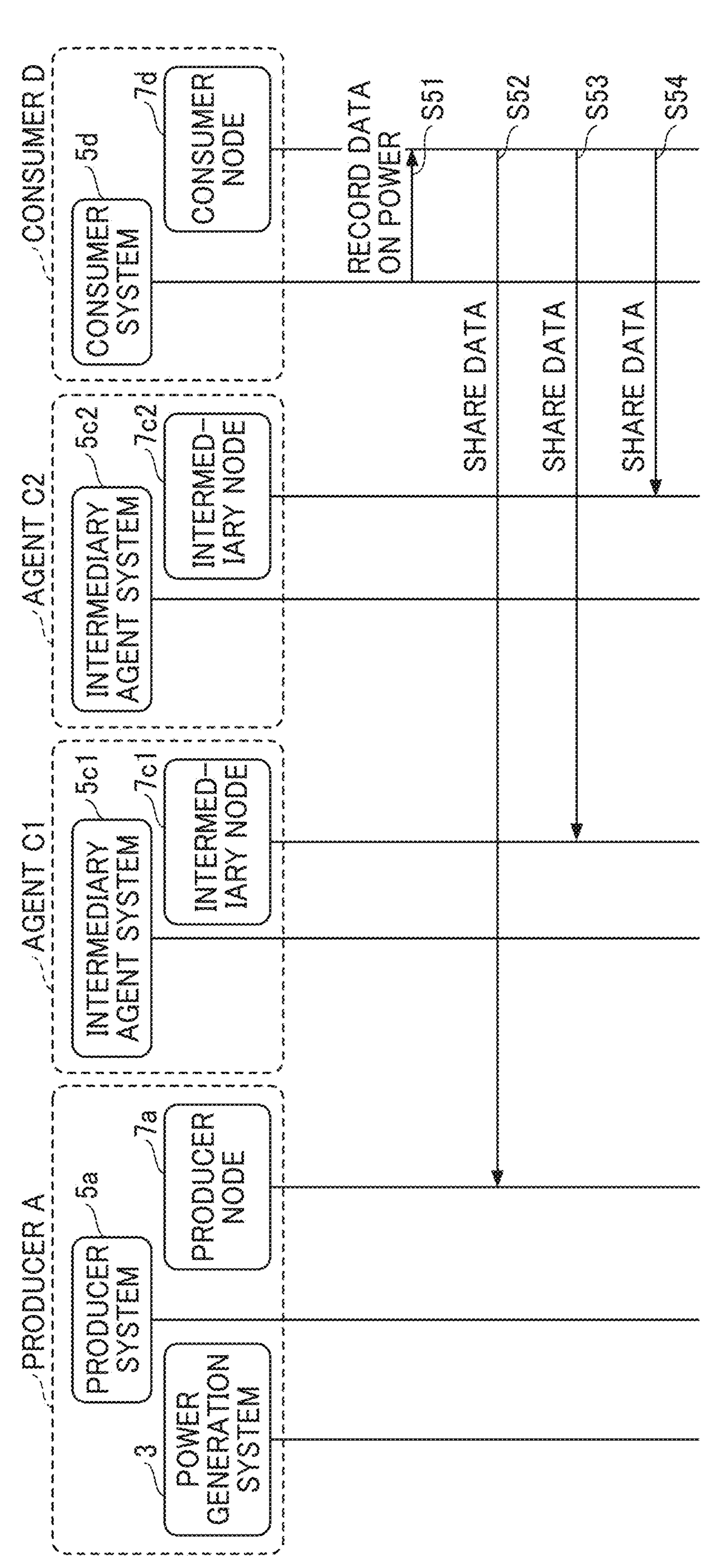
FIG. 10 is a sequence diagram illustrating processing or operation of sharing data related to consumed power on the blockchain network, which is performed in relation to the first processing or operation, according to an embodiment.

Referring now to FIG. 10, processing to share data related to electric power consumed by the consumer D in the blockchain network 100 is described according to the present embodiment. FIG. 10 is a sequence diagram illustrating processing or operation of sharing data related to consumed power on the blockchain network, performed in relation to the first pattern of processing or operation, according to the present embodiment.

S51: In the consumer system 5d, the measurement unit 53d measures an amount of consumed power, and the transmission and reception unit 51d transmits power consumption information indicating the measured amount of consumed power to the consumer node 7d, as data related to electric power consumed. The transmission and reception unit 71d of the consumer node 7d receives the power related data, and the storing and reading unit 78d stores the power related data in the storage unit 79d.

S52: The transmission and reception unit 71d of the consumer node 7d transmits the power related data to the producer node 7a. The transmission and reception unit 71a of the producer node 7a receives the power related data, and the storing and reading unit 78a stores the power related data in the storage unit 79a, such that data is shared.

S53: The transmission and reception unit 71d of the consumer node 7d transmits the power related data to the intermediary node 7c1. The transmission and reception unit 71c1 of the intermediary node 7c1 receives the power related data, and the storing and reading unit 78c1 stores the power related data in the storage unit 79c1, such that data is shared.

S54: The transmission and reception unit 71d of the consumer node 7d transmits the power related data to the intermediary node 7c2. The transmission and reception unit 71c2 of the intermediary node 7c2 receives the power related data, and the storing and reading unit 78c2 stores the power related data in the storage unit 79c2, such that data is shared.

Examples of Power Related Data and Contract Related Data

Referring now to FIGS. 11 and 12, examples of data to be shared on the blockchain network 100, in the first pattern of processing or operation, are described according to the present embodiment. The data to be shared includes data related to electric power (power related data) and data related to contracts (contract related data). FIG. 11 is a diagram illustrating a data structure of the power related data and the contract related data in a simplified form, when the stacking model is applied. FIG. 12 is a diagram illustrating a data structure of the power related data and the contract related data in a simplified form, when the ratio model is applied. The power related data is accessible by any of the entities illustrated in FIG. 1 including, for example, the producer A, the transaction market B, the intermediary agent C, the consumer D, the power storage operator S, and the certification authority E. In principle, the contract related data is accessible only by the entities involved in a specific transaction in relation to the contract related data. In some cases, the contract related data is accessible by the certification authority E.

(1-1) Stacking Model

In the first pattern of processing or operation, as illustrated in FIG. 11, the power related data 1111 includes the transaction status "generate power", the owner "producer A", the transaction amount of power "10 kWh", and the link information of the contract related data. The contract related data 1121 is stored in a storage location indicated by the link information. The contract related data 1121 indicates the price "10 yen/kWh" of electric power sold by the producer A to the intermediary agent C1. In principle, only the producer A and the intermediary agent C1, who are involved in the specific transaction in relation to the contract related data 1121, are given access to the contract related data 1121.

Still referring to FIG. 11, the power related data 1112 includes the transaction status "intermediate transfer", the owner "intermediary agent C1", the transaction amount of power "10 kWh", and the link information of the contract related data. The contract related data 1122 is stored in a storage location indicated by the link information. The contract related data 1122 indicates the terminal price (retail price) "15 yen/kWh" of electric power sold by the intermediary agent C1 to the consumer D. In this case, the service fee for the intermediary agent C1 is 5 yen/kWh (=15 yen/kWh-10 yen/kWh). In principle, only the intermediary agent C1 and the consumer D, who are involved in the specific transaction in relation to the contract related data 1122, are given access to the contract related data 1122.

Still referring to FIG. 11, the power related data 1113 includes the transaction status "consume", the owner "consumer D", and the transaction amount of power "10 kWh". The consumer D purchases electric power at 15 yen/kWh.

(1-2) Ratio Model

In the first pattern of processing or operation, as illustrated in FIG. 12, the power related data 1211 includes the transaction status "generate power", the owner "producer A", the transaction amount of power "10 kWh", and the link information of the contract related data. The contract related data 1221 is stored in a storage location indicated by the link information. The contract related data 1221 indicates that the ratio "50%" of the terminal price of electric power is applied, when electric power is sold by the producer A to the intermediary agent C1. This ratio is equivalent to the price of 7.5 yen/kWh (=0.5×15 yen/kWh). In principle, only the producer A and the intermediary agent C1, who are involved in the specific transaction in relation to the contract related data 1221, are given access to the contract related data 1221.

Since the power related data 1212 and 1213 are the same as the power related data 1112 and 1113 described above referring to FIG. 11, and the contract related data 1222 is the same as the contract related data 1122 described above referring to FIG. 11, the description thereof will be omitted.

Second Pattern of Processing or Operation

Referring to FIGS. 13 to 17, second pattern of processing or operation performed by the transaction system 1 is described according to the present embodiment. The second pattern of processing or operation corresponds to another sequence of processes to be performed when the intermediary agent C1 purchases electric power produced by the producer A and sells the electric power to the customer D. In particular, in the second pattern, the electric power to be sold by the intermediary agent C1 to the consumer D includes electric power supplied from the intermediary agent C2, to compensate for power shortage of the intermediary agent C1. Some processes in the processing or operation illustrated in FIGS. 13 and 14 to be performed in the second pattern of processing or operation, are substantially similar to some processes in the processing or operation illustrated in FIGS. 8 and 9, and the description thereof will be omitted.

The data related to electric power are stored in the public areas of the storage units 79*a*, 79*c*1, 79*c*2, and 79*d*, and the data related to contracts are stored in the private areas of the storage units 79*a*, 79*c*1, 79*c*2, and 79*d.*

Sharing of Data Related to Transferred Electric Power

Figure 13:
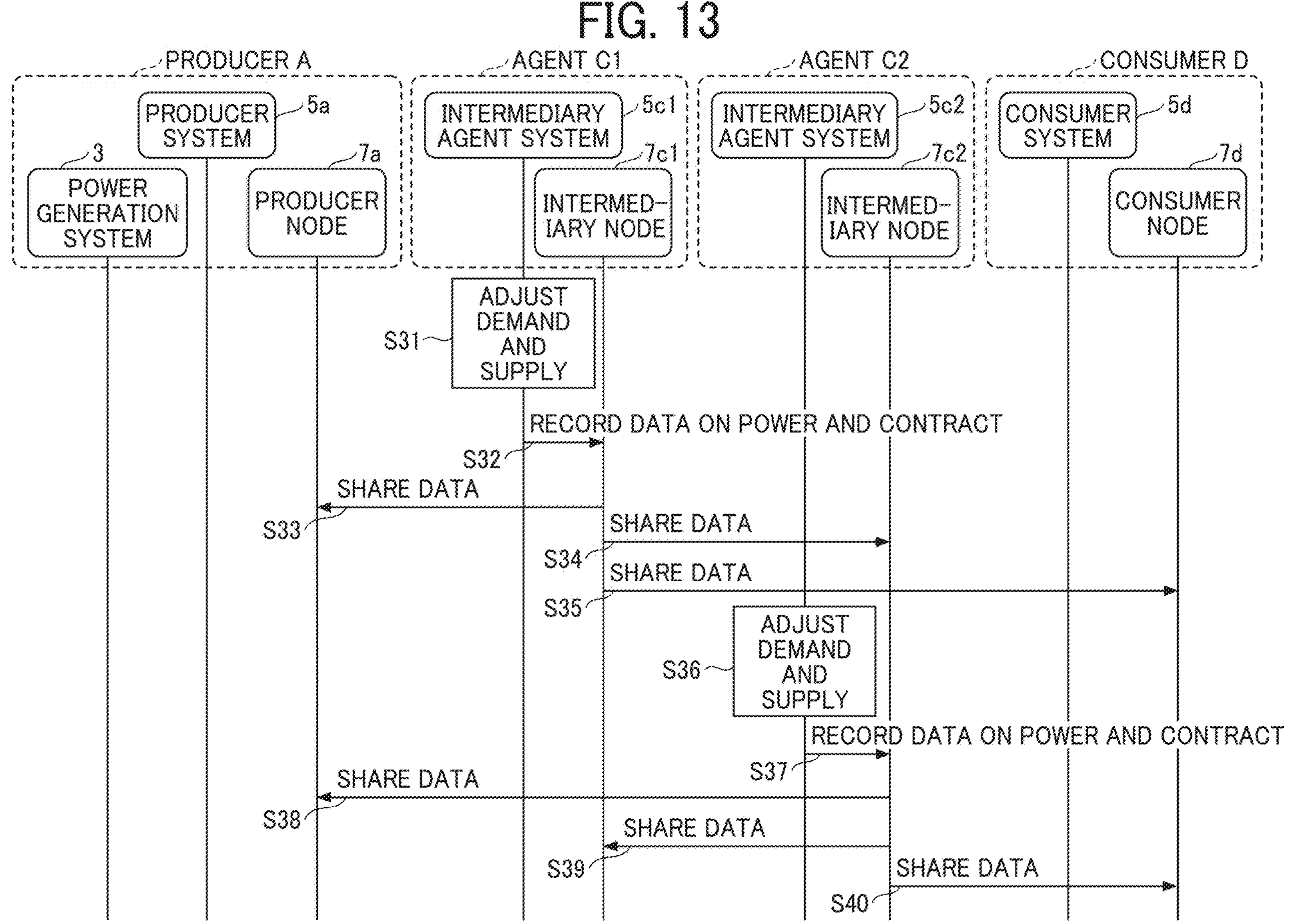
FIG. 13 is a sequence diagram illustrating processing or operation of sharing data related to transferred power and data related to contracts on the blockchain network, which is performed in relation to the second processing of operation, according to an embodiment.

FIG. 13 is a sequence diagram illustrating processing or operation of sharing data related to transferred power and data related to contracts on the blockchain network, performed in relation to the second pattern of processing or operation, according to the present embodiment. As illustrated in FIG. 13, after the steps S31 to S35 are performed as described above referring to FIG. 9, the intermediary system 5*c*2 and the intermediary node 7*c*2 perform the steps S36 to S40 that are substantially similar to the steps S31 to S35, which are performed by the intermediary system 5*c*1 and the intermediary node 7*c*1, and thus the description thereof will be omitted.

Sharing of Data Related to Electric Power in the Case of Surplus Power

Figure 14:
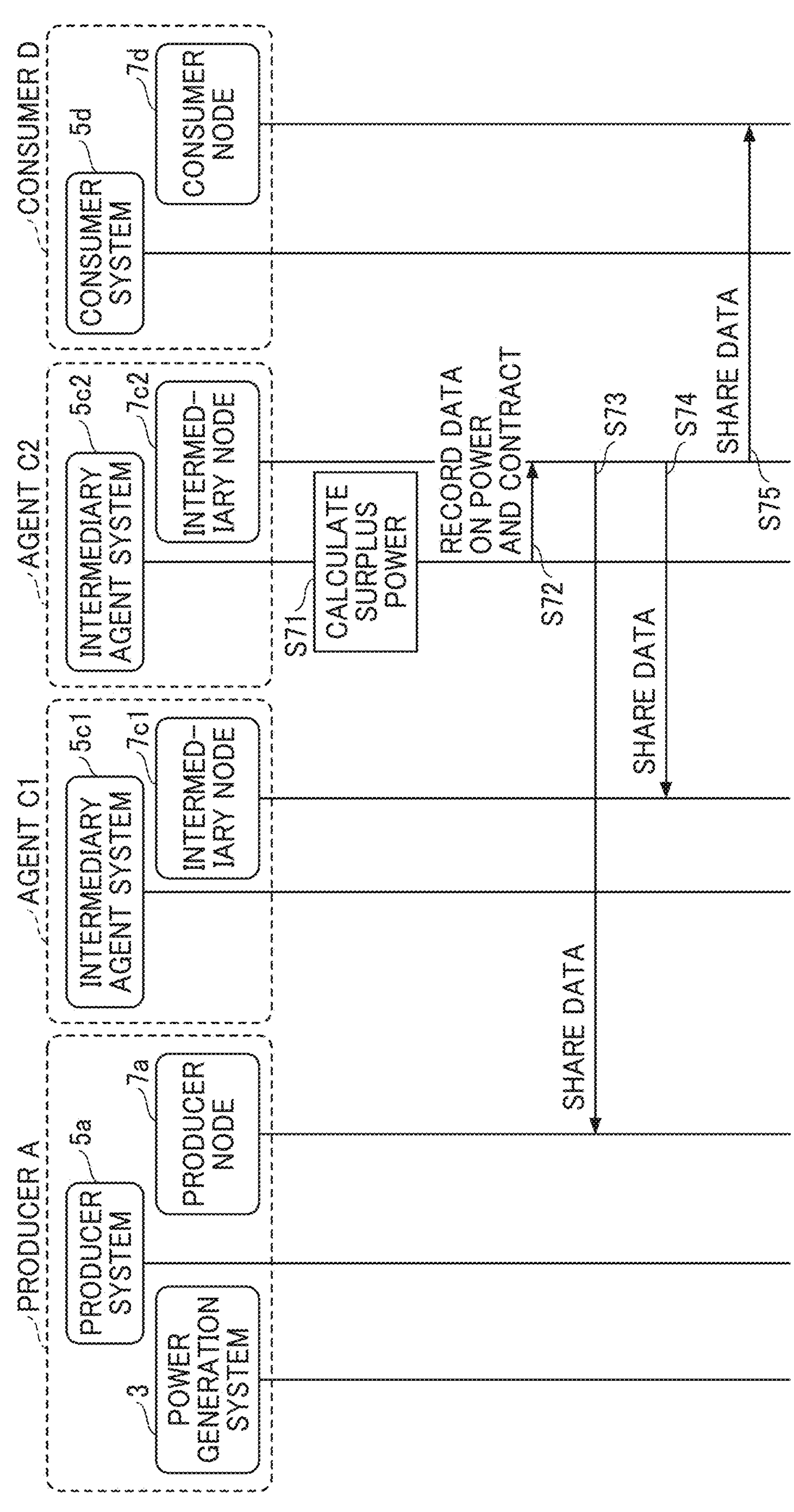
FIG. 14 is a sequence diagram illustrating processing or operation of sharing data related to surplus power and data related to contracts on the blockchain network, performed in relation to the second pattern of processing or operation, according to an embodiment.

Referring now to FIG. 14, processing to share data related to surplus power and data related to contracts in the blockchain network, performed by the intermediary agent C2, is described according to the present embodiment. FIG. 14 is a sequence diagram illustrating processing or operation of sharing data related to surplus power and data related to contracts on the blockchain network, performed in relation to the second pattern of processing or operation, according to the present embodiment. The following describes an example case in which electric power owned by the intermediary agent C2 (electric power produced from renewable energy) is excessive.

S71: In the intermediary system 5*c*2, the calculation unit 57*c*2 calculates the amount of power that will remain even if the power is supplied to the consumer D according to the contract, out of the total amount of power currently owned by the intermediary agent C2.

S72: In the intermediary system 5*c*2, the transmission and reception unit 51*c*2 transmits the data related to surplus power (surplus power related data) calculated by the calculation unit 57*c*2, and the contract related data, to the intermediary node 7*c*2. The transmission and reception unit 71*c*2 of the intermediary node 7*c*2 receives the surplus power related data and the contract related data, and the storing and reading unit 78*c*2 stores the surplus power related data and the contract related data in the storage unit 79*c*2.

S73: The transmission and reception unit 71*c*2 of the intermediary node 7*c*2 transmits the surplus power related data and the contract related data to the producer node 7*a*. The transmission and reception unit 71*a* of the producer node 7*a* receives the surplus power related data and the contract related data, and the storing and reading unit 78*a* stores the surplus power related data and the contract related data in the storage unit 79*a* to share data.

S74: The transmission and reception unit 71*c*2 of the intermediary node 7*c*2 transmits the surplus power related data and the contract related data to the intermediary node 7*c*1. The transmission and reception unit 71*c*1 of the intermediary node 7*c*1 receives the surplus power related data and the contract related data, and the storing and reading unit 78*c*1 stores the surplus power related data and the contract related data in the storage unit 79*c*1, such that data is shared.

S75: The transmission and reception unit 71*c*2 of the intermediary node 7*c*2 transmits the surplus power related data and the contract related data to the consumer node 7*d*. The transmission and reception unit 71*d* of the consumer node 7*d* receives the surplus power related data and the contract related data, and the storing and reading unit 78*d* stores the surplus power related data and the contract related data in the storage unit 79*d* to share the data.

Figure 15:
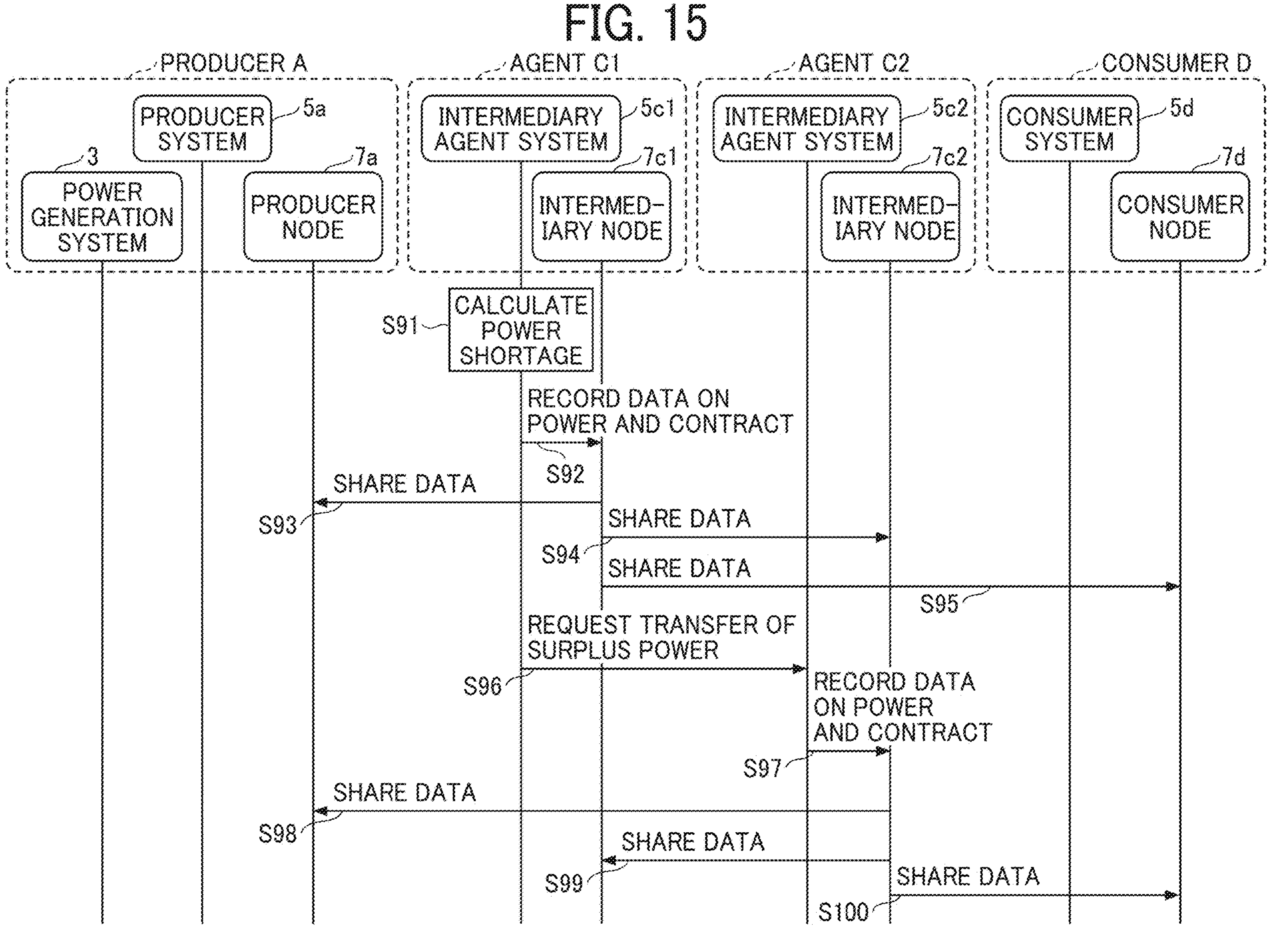
FIG. 15 is a sequence diagram illustrating processing or operation of sharing data related to power shortage and data related to contracts, and data related to transfer of surplus power and data related to contracts, on the blockchain network, performed in relation to the second pattern of processing or operation, according to an embodiment.

Sharing of Data Related to Power Shortage and Sharing of Data Related to Transfer of Surplus Power Referring now to FIG. 15, processing to share data related to power shortage in the blockchain network 100 performed by the intermediary agent C1, and processing to share data related to transfer of surplus power performed by the intermediary agent C2, are described according to the present embodiment. FIG. 15 is a sequence diagram illustrating processing or operation of sharing data related to power shortage and data related to contracts, and data related to transfer of surplus power and data related to contracts, on the blockchain network 100, performed in relation to the second pattern of processing or operation, according to the present embodiment. The following describes an example case in which electric power owned by the intermediary agent C1 (electric power produced from renewable energy) is insufficient.

S91: In the intermediary system 5*c*1, the calculation unit 57*c*1 calculates an amount of power shortage, to satisfy an amount of power to be supplied to the consumer D by the intermediary agent C1 according to the contract.

S92: In the intermediary system 5*c*1, the transmission and reception unit 51*c*1 transmits data related to power shortage (power shortage related data) calculated by the calculation unit 57*c*1, and the contract related data, to the intermediary node 7*c*1. The transmission and reception unit 71*c*1 of the intermediary node 7*c*1 receives the power shortage related data and the contract related data, and the storing and reading unit 78c1 stores the power shortage related data and the contract related data in the storage unit 79c1.

S93: The transmission and reception unit 71c1 of the intermediary node 7c1 transmits the power shortage related data and the contract related data to the producer node 7a. The transmission and reception unit 71a of the producer node 7a receives the power shortage related data and the contract related data, and the storing and reading unit 78a stores the power shortage related data and the contract related data in the storage unit 79a to share data.

S94: The transmission and reception unit 71c1 of the intermediary node 7c1 transmits the power shortage related data and the contract related data to the intermediary node 7c2. The transmission and reception unit 71c2 of the intermediary node 7c2 receives the power shortage related data and the contract related data, and the storing and reading unit 78c2 stores the power shortage related data and the contract related data in the storage unit 79c2, such that data is shared.

S95: The transmission and reception unit 71c1 of the intermediary node 7c1 transmits the power shortage related data and the contract related data to the consumer node 7d. The transmission and reception unit 71d of the consumer node 7d receives the power shortage related data and the contract related data, and the storing and reading unit 78d stores the power shortage related data and the contract related data in the storage unit 79d to share the data.

S96: In the intermediary system 5c1, the adjustment unit 55c1 determines an amount of power transferable within an amount of surplus power based on the surplus power related data, shared at the processing of S74. The transmission and reception unit 51c1 of the intermediary system 5c1 transmits to the intermediary system 5c2 a transfer request for transferring surplus power currently owned by the intermediary agent C2. The transfer request includes information on a name of a requester of the transfer request, and an amount of power for which the transfer is requested.

As a result, the transmission and reception unit 51c2 of the intermediary system 5c2 receives the transfer request for transferring surplus power.

S97: In the intermediary system 5c2, the calculation unit 57c2 determines whether electric power can be transferred in an amount requested by the intermediary system 5c1. In other words, the intermediary system 5c2 determines whether there is surplus power related data having a total surplus power equal to or greater than an amount requested by the intermediary system 5c1. In a case where electric power is transferrable in the requested amount, the transmission and reception unit 51c2 transmits, to the intermediary node 7c2, data related to surplus power, which has a total surplus power satisfying an amount of electric power requested by the intermediary system 5c1, and the contract related data. The transmission and reception unit 71c2 of the intermediary node 7c2 receives the surplus power related data and the contract related data, and the storing and reading unit 78c2 stores the surplus power related data and the contract related data in the storage unit 79c2. In this case, the data structure illustrated in FIG. 5 indicates that the transaction status is "transfer or retail (sell)", the current owner of the electric power is "intermediary agent C1", and the previous owner of the electric power is "intermediary agent C2". Further, an amount of "remaining surplus power" is also updated, to reflect electric power being transferred.

S98: The transmission and reception unit 71c2 of the intermediary node 7c2 transmits the surplus power related data and the contract related data to the producer node 7a. The transmission and reception unit 71a of the producer node 7a receives the surplus power related data and the contract related data, and the storing and reading unit 78a stores the surplus power related data and the contract related data in the storage unit 79a to share data.

S99: The transmission and reception unit 71c2 of the intermediary node 7c2 transmits the surplus power related data and the contract related data to the intermediary node 7c1. The transmission and reception unit 71c1 of the intermediary node 7c1 receives the surplus power related data and the contract related data, and the storing and reading unit 78c1 stores the surplus power related data and the contract related data in the storage unit 79c1, such that data is shared.

S100: The transmission and reception unit 71c2 of the intermediary node 7c2 transmits the data related to electric power, which is updated, to the consumer node 7d. The transmission and reception unit 71d of the consumer node 7d receives the power shortage related data, and the storing and reading unit 78d stores the power shortage related data in the storage unit 79d to share data.

Examples of Power Related Data and Contract Related Data

Referring now to FIGS. 16 and 17, examples of data to be shared on the blockchain network 100, in the second pattern of processing or operation, are described according to the present embodiment. The data to be shared includes data related to electric power (power related data) and data related to contracts (contract related data). FIG. 16 is a diagram illustrating a data structure of the power related data and the contract related data in a simplified form, when the stacking model is applied. FIG. 17 is a diagram illustrating a data structure of the power related data and the contract related data in a simplified form, when the ratio model is applied. The power related data is accessible by any of the entities illustrated in FIG. 1 including, for example, the producer A, the transaction market B, the intermediary agent C, the consumer D, the power storage operator S, and the certification authority E. In principle, the contract related data is accessible only by the entities involved in a specific transaction in relation to the contract related data. In some cases, the contract related data is accessible by the certification authority E.

(2-1) Stacking Model

In the second pattern of processing or operation, as illustrated in FIG. 16, the power related data 2111 includes the transaction status "generate power", the owner "producer A", the transaction amount of power "10 kWh", and the link information of the contract related data. The contract related data 2121 is stored in a storage location indicated by the link information. The contract related data 2121 indicates the price "10 yen/kWh" of electric power sold by the producer A to the intermediary agent C2. In principle, only the producer A and the intermediary agent C2, who are involved in the specific transaction in relation to the contract related data 2121, are given access to the contract related data 2121.

Still referring to FIG. 16, the power related data 2112 includes the transaction status "intermediate transfer", the owner "intermediary agent C2", the transaction amount of power "10 kWh", and the link information of the contract related data. The contract related data 2122 is stored in a storage location indicated by the link information. The contract related data 2122 indicates the transaction price (resale price) "13 yen/kWh" of electric power, transferred by the intermediary agent C2 to another intermediary agent (for example, the intermediary agent C1). In this case, the service fee for the intermediary agent C2 is 3 yen/kWh (=13 yen/kWh-10 yen/kWh). In principle, only the intermediary agent C2 and the other intermediary agent (for example, the intermediary agent C1), who are involved in the specific transaction in relation to the contract related data 2122, are given access to the contract related data 2122.

Still referring to FIG. 16, the power related data 2113 includes the transaction status "intermediate transfer", the owner "intermediary agent C1", the transaction amount of power "10 kWh", and the link information of the contract related data. The contract related data 2123 is stored in a storage location indicated by the link information. The contract related data 2123 indicates the terminal price (retail price) "15 yen/kWh" of electric power sold by the intermediary agent C1 to the consumer D. In this case, the service fee for the intermediary agent C1 is 2 yen/kWh (=15 yen/kWh-13 yen/kWh). In principle, only the intermediary agent C1 and the consumer D, who are involved in the specific transaction in relation to the contract related data 2123, are given access to the contract related data 2123.

Still referring to FIG. 16, the power related data 2114 includes the transaction status "consume", the owner "consumer D", and the transaction amount of power "10 kWh". The consumer D purchases electric power at 15 yen/kWh.

(2-2) Ratio Model

In the second pattern of processing or operation, as illustrated in FIG. 17, the power related data 2211 includes the transaction status "generate power", the owner "producer A", the transaction amount of power "10 kWh", and the link information of the contract related data. The contract related data 2221 is stored in a storage location indicated by the link information. The contract related data 2221 indicates that the ratio "50%" of the transaction price (resale price) is applied when the intermediary agent C2 sells electric power to the customer D. This ratio is equivalent to the price of 6.5 yen/kWh (=0.5×13 yen/kWh). In principle, only the producer A and the intermediary agent C2, who are involved in the specific transaction in relation to the contract related data 2221, are given access to the contract related data 2221.

Since the power related data 2212, 2213, and 2214 are the same as the power related data 2112, 2113, and 2114 described above referring to FIG. 16, and the contract related data 2222 and 2223 are the same as the contract related data 2122 and 2123 described above referring to FIG. 16, the description thereof will be omitted.

Third Pattern of Processing or Operation

Referring to FIGS. 18 to 24, the third pattern of processing or operation performed by the transaction system 1 is described according to the present embodiment. The third pattern of processing or operation corresponds to another sequence of processes to be performed when the intermediary agent C1 purchases electric power produced by the producer A. In particular, in the third pattern, the intermediary agent C1 charges a part of the purchased electric power in the storage battery system **5*f*2, and when electric power to be sold to the customer D is insufficient, the intermediary agent C1 sells the electric power including the electric power discharged from the storage battery system 5*f*2** to the customer D.

The data related to electric power are stored in the public areas of the storage units **79*a*, 79*c*1, 79*d*, and 79*f*2, and the data related to contracts are stored in the private areas of the storage units 79*a*, 79*c*1, 79*d*, and 79*f*2**.

Sharing of Data Related to Produced Electric Power

Figure 18:
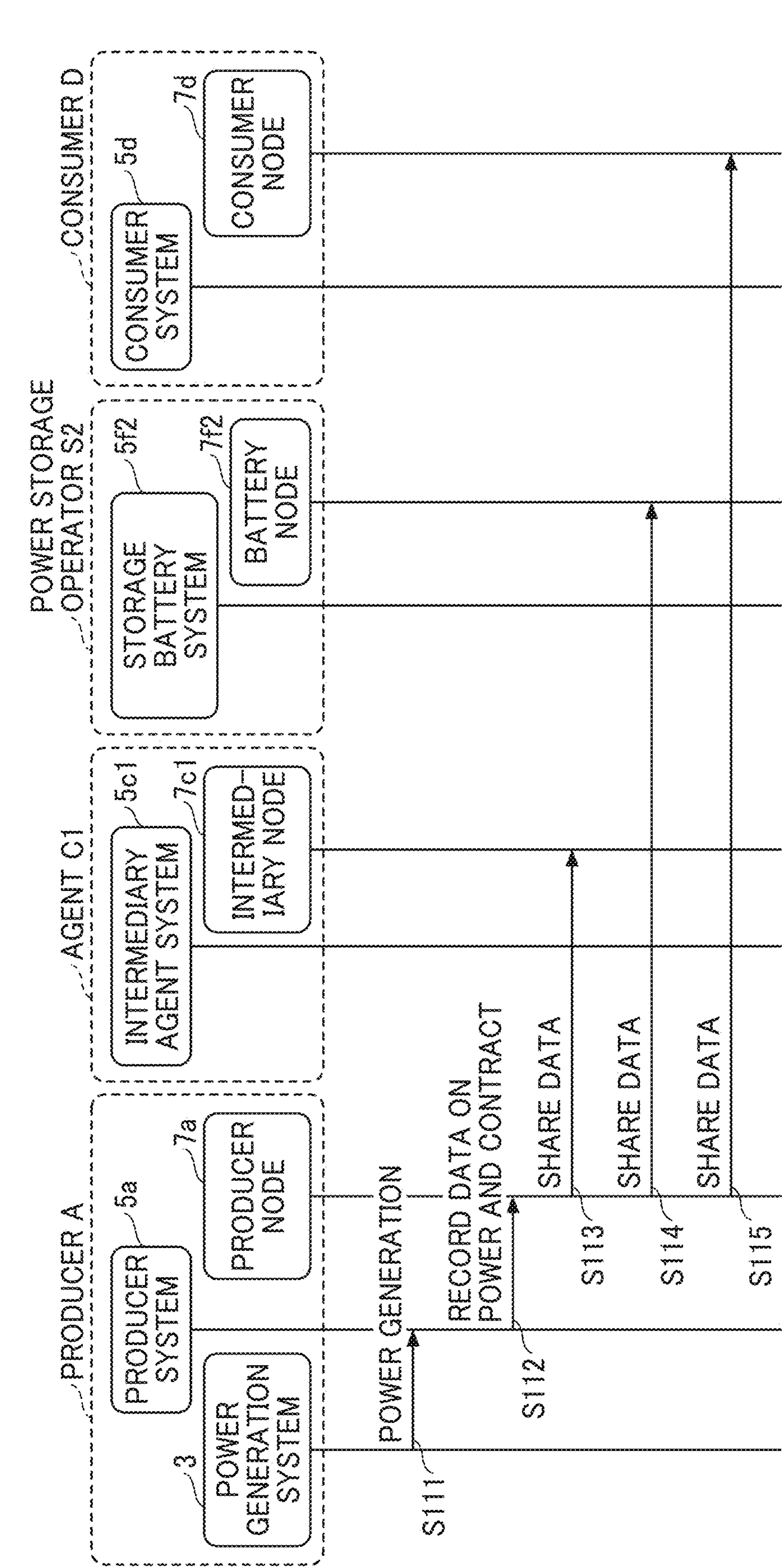
FIG. 18 is a sequence diagram illustrating processing or operation of sharing data related to produced power and data related to contracts on the blockchain network, which is performed in relation to the third pattern of processing or operation, according to an embodiment.

First, referring to FIG. 18, processing to share data related to electric power produced by the producer A and data related to contracts in the blockchain network 100 is described below according to the present embodiment. FIG. 18 is a sequence diagram illustrating processing or operation of sharing data related to produced power and data related to contracts on the blockchain network, performed in relation to the third pattern of processing or operation, according to the present embodiment.

The processing or operation of FIG. 18 is substantially the same as the processing or operation of FIG. 8, except that the intermediary agent C2 of FIG. 8 is replaced with the power storage operator S2, and thus the description thereof will be omitted. The steps S111 to S115 of FIG. 18 are performed in a substantially similar manner as described above referring to the processes S11 to S15 of FIG. 8.

Sharing of Data Related to Electric Power in the Case of Surplus Power

Figure 19:
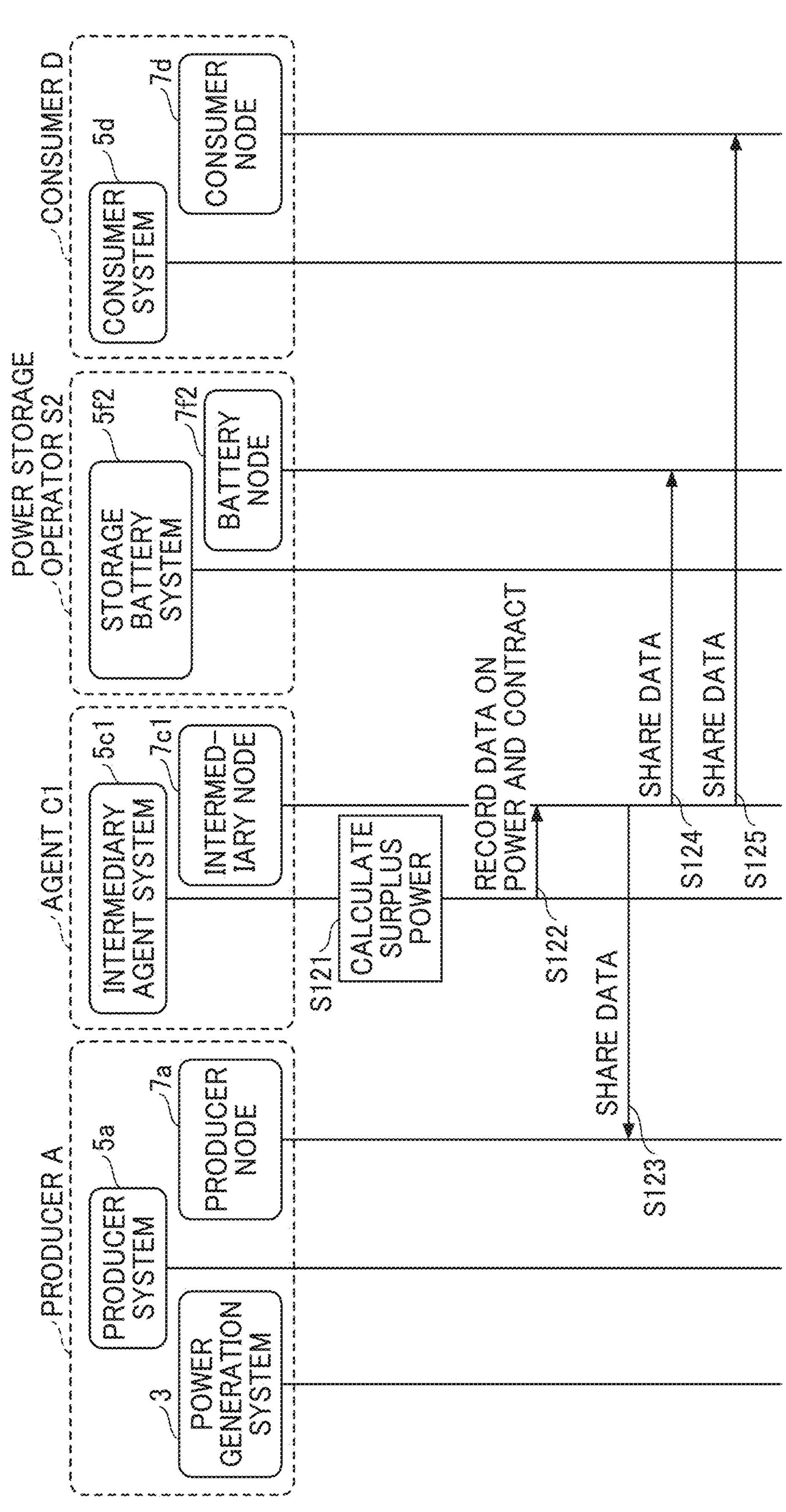
FIG. 19 is a sequence diagram illustrating processing or operation of sharing data related to electric power to be charged and data related to contracts on the blockchain network, performed in relation to the third pattern of processing or operation, according to an embodiment.

Referring now to FIG. 19, processing to share data related to charged power and data on contracts in the blockchain network, performed by the intermediary agent C1, is described according to the present embodiment. FIG. 19 is a sequence diagram illustrating processing or operation of sharing data related to electric power to be charged and data related to contracts on the blockchain network, performed in relation to the third pattern of processing or operation, according to the present embodiment.

S121: In the intermediary system **5*c*1, the calculation unit 57*c*1** calculates the amount of power that will remain even if the power is supplied to the consumer D according to the contract, out of the total amount of power currently owned by the intermediary agent C1. In this embodiment, the calculated amount of surplus power will be charged.

S122: In the intermediary system **5*c*1, the transmission and reception unit 51*c*1 transmits data related to charged power (charged power related data) calculated by the calculation unit 57*c*1, and the contract related data, to the intermediary node 7*c*1. The transmission and reception unit 71*c*1 of the intermediary node 7*c*1 receives the charged power related data and the contract related data, and the storing and reading unit 78*c*1 stores the charged power related data and the contract related data in the storage unit 79*cl***.

S123: The transmission and reception unit **71*c*1 of the intermediary node 7*c*1 transmits the charged power related data and the contract related data to the producer node 7*a*. The transmission and reception unit 71*a* of the producer node 7*a* receives the charged power related data and the contract related data, and the storing and reading unit 78*a* stores the charged power related data and the contract related data in the storage unit 79*a*** to share data.

S124: The transmission and reception unit **71*c*1 of the intermediary node 7*c*1 transmits the charged power related data and the contract related data to the storage battery node 7*f*2. The transmission and reception unit 71*f*2 of the storage battery node 7*f*2 receives the charged power related data and the contract related data, and the storing and reading unit 78*f*2 stores the charged power related data and the contract related data in the storage unit 79*f*2** to share data.

S125: The transmission and reception unit 71$c$1 of the intermediary node 7$c$1 transmits the data related to electric power, specifically, the charged power related data, to the consumer node 7$d$. The transmission and reception unit 71$d$ of the consumer node 7$d$ receives the charged power related data, and the storing and reading unit 78$d$ stores the charged power related data in the storage unit 79$d$ to share data.

Sharing of Data Related to Electric Power in the Case of Power Discharge

Figure 20:
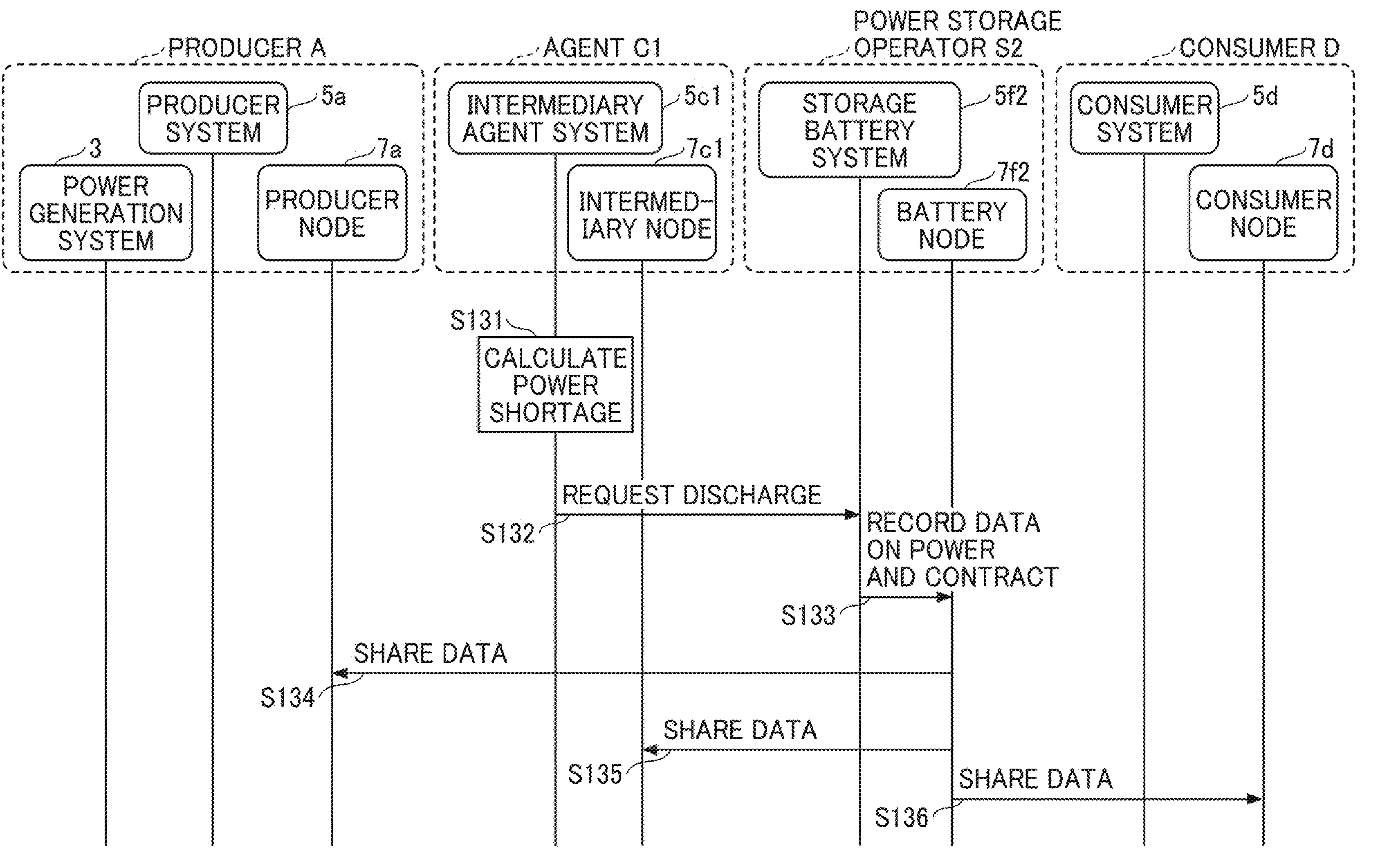
FIG. 20 is a sequence diagram illustrating processing or operation of sharing data related to electric power to be discharged and data related to contracts on the blockchain network, performed in relation to the third pattern of processing or operation, according to an embodiment.

Referring now to FIG. 20, processing to share data related to discharged power in the blockchain network, performed by the intermediary agent C1, is described according to the present embodiment. FIG. 20 is a sequence diagram illustrating processing or operation of sharing data related to electric power to be discharged and data related to contracts on the blockchain network, performed in relation to the third pattern of processing or operation, according to the present embodiment.

S131: In the intermediary system 5$c$1, the calculation unit 57$c$1 calculates an amount of electric power shortage, to satisfy an amount of electric power to be supplied to the consumer D by the intermediary agent C1 according to the contract.

S132: In the intermediary system 5$c$1, the adjustment unit 55$c$1 determines an amount of electric power to be discharged, which is within an amount of electric power being charged, based on the charged power related data that is shared at S122. The transmission and reception unit 51$c$1 of the intermediary system 5$c$1 transmits a discharge request for discharging the determined amount of electric power, to the storage battery system 5$f$2. The transfer request includes information on a name of a requester of the discharge request, and an amount of power for which the discharge is requested. As a result, the transmission and reception unit 51$c$2 of the intermediary system 5$c$2 receives the discharge request for discharging electric power.

S133: In the storage battery system 5$f$2, the transmission and reception unit 51$f$2 transmits, to the storage battery node 7$f$2, the discharged power related data and the contract related data. The discharge power related data indicates an amount of electric power requested from the intermediary system 5$c$1. The transmission and reception unit 71$f$2 of the storage battery node 7$f$2 receives the discharged power related data and the contract related data, and the storing and reading unit 78$f$2 stores the discharged power related data and the contract related data in the storage unit 79$f$2.

S134: The transmission and reception unit 71$f$2 of the storage battery node 7$f$2 transmits the discharged power related data and the contract related data to the producer node 7$a$. The transmission and reception unit 71$a$ of the producer node 7$a$ receives the discharged power related data and the contract related data, and the storing and reading unit 78$a$ stores the discharged power related data and the contract related data in the storage unit 79$a$ to share data.

S135: The transmission and reception unit 71$f$2 of the storage battery node 7$f$2 transmits the discharged power related data and the contract related data to the intermediary node 7$c$1. The transmission and reception unit 71$c$1 of the intermediary node 7$c$1 receives the discharged power related data and the contract related data, and the storing and reading unit 78$c$1 stores the discharged power related data and the contract related data in the storage unit 79$c$1, such that data is shared.

S136: The transmission and reception unit 71$f$2 of the storage battery node 7$f$2 transmits the discharged power related data to the consumer node 7$d$. The transmission and reception unit 71$d$ of the consumer node 7$d$ receives the discharged power related data, and the storing and reading unit 78$d$ stores the discharged power related data in the storage unit 79$d$ to share data.

Sharing of Data Related to Transferred Electric Power

Figure 21:
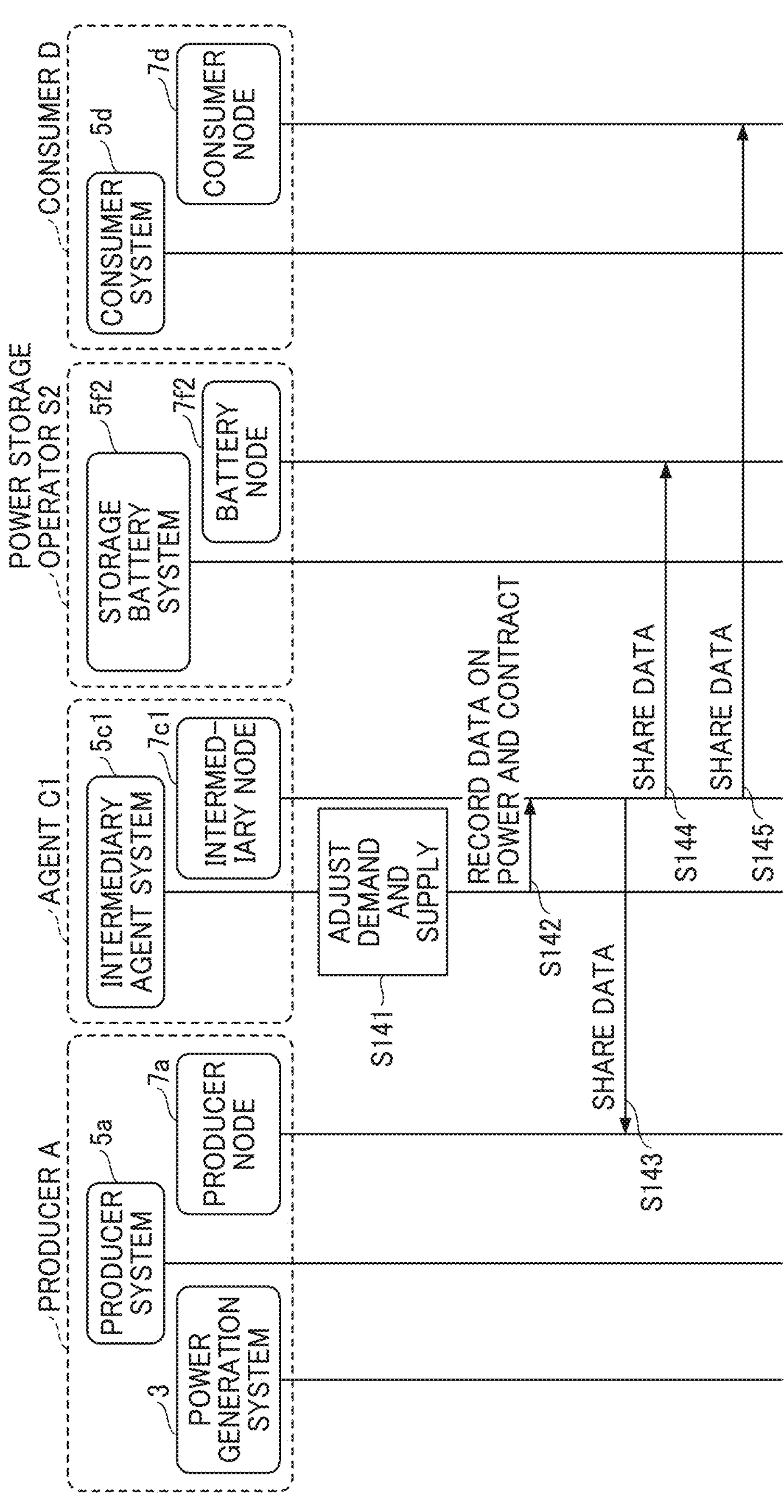
FIG. 21 is a sequence diagram illustrating processing or operation of sharing data related to transferred power and data related to contracts on the blockchain network, which is performed in relation to the third processing of operation, according to an embodiment.

Referring now to FIG. 21, processing to share data related to electric power that the intermediary agent C1 intermediates transfer in the blockchain network is described according to the embodiment. FIG. 21 is a sequence diagram illustrating a part of the third processing or operation, specifically, processing or operation of sharing data related to allocation of electric power on the blockchain network, according to the present embodiment. The processing or operation of FIG. 21 is substantially the same as the processing or operation of FIG. 9, except that the intermediary agent C2 of FIG. 8 is replaced with the power storage operator S2, and thus the description thereof will be omitted. The processes S141 to S145 of FIG. 21 are performed in a substantially similar manner as described above referring to the processes S31 to S35 of FIG. 9.

Sharing of Data Related to Consumed Electric Power

Figure 22:
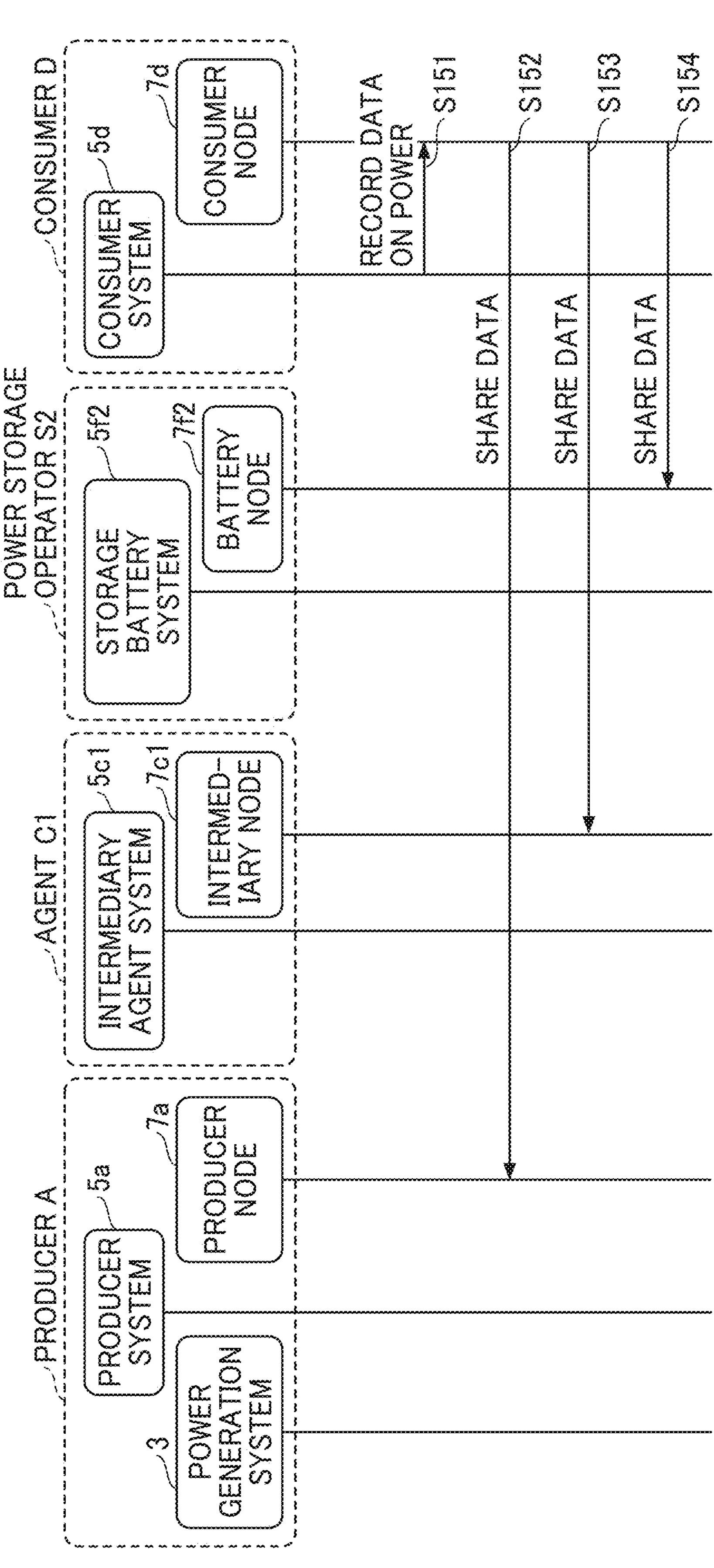
FIG. 22 is a sequence diagram illustrating processing or operation of sharing data related to consumed power on the blockchain network, performed in relation to the third pattern of processing or operation, according to an embodiment.

Referring now to FIG. 22, processing to share data related to electric power consumed by the consumer D in the blockchain network 100 is described according to the present embodiment. FIG. 22 is a sequence diagram illustrating processing or operation of sharing data related to consumed power on the blockchain network, performed in relation to the third pattern of processing or operation, according to the present embodiment. The processing or operation of FIG. 22 is substantially the same as the processing or operation of FIG. 10, except that the intermediary agent C2 of FIG. 8 is replaced with the power storage operator S2, and thus the description thereof will be omitted. The processes S151 to S154 of FIG. 22 are performed in a substantially similar manner as described above referring to the processes S51 to S54 of FIG. 10.

Examples of Power Related Data and Contract Related Data

Referring now to FIGS. 23 and 24, examples of data to be shared on the blockchain network 100, in the third pattern of processing or operation, are described according to the present embodiment. The data to be shared includes data related to electric power (power related data) and data related to contracts (contract related data). FIG. 23 is a diagram illustrating a data structure of the power related data and the contract related data in a simplified form, when the stacking model is applied. FIG. 24 is a diagram illustrating a data structure of the power related data and the contract related data in a simplified form, when the ratio model is applied. The power related data is accessible by any of the entities illustrated in FIG. 1 including, for example, the producer A, the transaction market B, the intermediary agent C, the consumer D, the power storage operator S, and the certification authority E. In principle, the contract related data is accessible only by the entities involved in a specific transaction in relation to the contract related data. In some cases, the contract related data is accessible by the certification authority E.

(3-1) Stacking Model

In the third pattern of processing or operation, as illustrated in FIG. 23, the power related data 3111 includes the transaction status "generate power", the owner "producer A", the transaction amount of power "10 kWh", and the link information of the contract related data. The contract related data 3121 is stored in a storage location indicated by the link information. The contract related data 3121 indicates the price "10 yen/kWh" of electric power sold by the producer A to the intermediary agent C1. In principle, only the producer A and the intermediary agent C1, who are involved in the specific transaction in relation to the contract related data 3121, are given access to the contract related data 3121.

Still referring to FIG. 23, the power related data 3112 includes the transaction status "intermediate transfer", the owner "intermediary agent C1", the transaction amount of power "10 kWh", and the link information of the contract related data. The contract related data 3122 is stored in a storage location indicated by the link information. The contract related data 3122 indicates the transaction price (terminal price) "15 yen/kWh" of electric power sold by the intermediary agent C1 to the consumer D. In this case, the service fee for the intermediary agent C1 is 5 yen/kWh (=15 yen/kWh-10 yen/kWh). In principle, only the intermediary agent C1 and the consumer D, who are involved in the specific transaction in relation to the contract related data 3122, are given access to the contract related data 3122.

The intermediary agent C1 sells the electric power to the customer D in the determined amount. In a case where the electric power remains in a certain amount, the intermediary agent C1 may resell the electric power to the power storage operator S to charge the electric power in the remained amount. For example, since electric power cannot be produced by solar light at night, the stored electric power can be supplied to a consumer who requests electric power produced from renewable energy at night. The following describes the case where the surplus electric power is charged at least temporarily.

Still referring to FIG. 23, the power related data 3113 includes the transaction status "store power", the owner "power storage operator S2", the transaction amount of power "10 kWh", and the link information of the contract related data. The contract related data 3123 is stored in a storage location indicated by the link information. The contract related data 3123 indicates the storage price "3 yen/kWh" of electric power temporarily stored by the power storage operator S2 for the intermediary agent C1. In principle, only the intermediary agent C1 and the power storage operator S2, who are involved in the specific transaction in relation to the contract related data 3123, are given access to the contract related data 3123.

For example, when the intermediary agent C1 sells electric power to the customer D at night, the intermediary agent C1 buys back the electric power temporarily stored from the power storage operator S2 and sells the electric power to the customer D.

Still referring to FIG. 23, the power related data 3114 includes the transaction status "intermediate transfer", the owner "intermediary agent C1", the transaction amount of power "10 kWh", and the link information of the contract related data. The contract related data 3124 is stored in a storage location indicated by the link information. The contract related data 3124 indicates the transaction price (terminal price) "18 yen/kWh" of electric power sold by the intermediary agent C1 to the consumer D. In this case, the service fee for the intermediary agent C1 is 5 yen/kWh (=18 yen/kWh-3 yen/kWh-10 yen/kWh). In principle, only the intermediary agent C1 and the consumer D, who are involved in the specific transaction in relation to the contract related data 3124, are given access to the contract related data 3124.

Alternatively, the intermediary agent C1 may manage the storage battery system 5/2 instead of the power storage operator S2. In such case, the owner indicated by the power related data 3113 is "Intermediary Agent C1".

Still referring to FIG. 23, the power related data 3115 includes the transaction status "consume", the owner "consumer D", and the transaction amount of power "10 kWh". The consumer D purchases electric power at 18 yen/kWh.

(3-2) Ratio Model

In the third pattern of processing or operation, as illustrated in FIG. 24, the power related data 3211 includes the transaction status "generate power", the owner "producer A", the transaction amount of power "10 kWh", and the link information of the contract related data. The contract related data 3221 is stored in a storage location indicated by the link information. The contract related data 3221 indicates that the ratio "50%" of the transaction price (terminal price) of electric power is applied, when electric power is sold by the intermediary agent C1 directly to the consumer D, without storing the electric power, for example, in the daytime. This ratio is equivalent to the price of 7.5 yen/kWh (=0.5×15 yen/kWh). Alternatively, the contract related data 3221 may indicate that the ratio "50%" of the transaction price (terminal price) of electric power is applied, when electric power, which is stored at night, is sold by the intermediary agent C1 to the consumer D. This ratio is equivalent to the price of 9 yen/kWh (=0.5×18 yen/kWh). In principle, only the producer A and the intermediary agent C1, who are involved in the specific transaction, in relation to the contract related data 3221, are given access to the contract related data 3221.

Since the power related data 3212, 3213, 3214, and 3215 are the same as the power related data 3112, 3113, 3114, and 3115 described above referring to FIG. 23, and the contract related data 3222 and 3224 is the same as the contract related data 3122 and 3124 described above referring to FIG. 23, the description thereof will be omitted.

The contract related data 3223 indicates that the ratio "20%" of the storage price of electric power, which is temporarily stored by the power storage operator S2 for the intermediary agent C1, is applied. This ratio is a ratio of the price, with respect to the price of "15 yen/kWh" sold by the intermediary agent C1 in the daytime, for example. This ratio is equivalent to the price of 3 yen/kWh (=0.2× 15 yen/kWh).

As described above, according to the one or more embodiments described above, the transaction system 1 traces (tracks) the price of electric power in transactions using the blockchain network 100.

Further, in principle, the contract related data, which includes information on the price (or the price that can be calculated from the ratio) of electric power, can only be accessed by the entities involved in the specific transaction related to such contract related data. The entities, who do not want to disclose the information on the price of electric power, would be more comfortable to use the transaction system 1 on the blockchain network 100, thus enhancing the effectiveness of the transaction system 1 on the blockchain network 100.

Furthermore, in addition to the price of electric power, information on the charging and discharging of electric power are managed on the blockchain network 100. Even if the price of electric power becomes slightly high, some entities may want to still use electric power produced from renewable energy. The transaction system 1 can trace (track) the charging or discharging of electric power, in addition to the price of electric power, to meet such need.

The electric power produced from renewable energy is interchanged between a plurality of intermediary agents C, without separating the value for using renewable energy and the electric power produced from renewable energy. Accordingly, the intermediary agent C is able to intermediate the transfer of asset produced by a specific production method (electric power produced from renewable energy) to a user such as a consumer according to the contract. Specifically, the intermediary agent intermediates transfer of an asset produced by a specific type for a user based on contract, without separating the value of being produced by a specific type of production method (such as the value of using renewable energy), from a specific asset produced by the specific type of production method (such as electric power produced from renewable energy).

Further, through the processing of S72 to S75, data related to surplus power owned by the intermediary agent C2 is shared with such as the intermediary agent C1. The intermediary agent C1 does not have to ask another intermediary agent C2 whether or not the intermediary agent C2 owns surplus power. As a result, the intermediary agent C1 can quickly receive the surplus power from the intermediary agent C2, such that supply-demand balance can be maintained for electric power produced from renewable energy.

Furthermore, as illustrated in FIG. 1, each system (producer system 5*a*, transaction market system 5*b*, intermediary systems 5*c*1 and 5*c*2, consumer system 5*d*, or storage battery systems 5*f*1 to 5*f*3) does not have to newly develop an interface other than the interface to connect to its own node (producer node 7*a*, transaction market node 7*b*, intermediary nodes 7*c*1 and 7*c*2, consumer node 7*d*, or storage battery nodes 7*f*1 to 7*f*3) and making it easier for the systems to operate in cooperation.

Since the blockchain network 100 is constructed to record the data on the interchange or transaction of renewable energy (data related to electric power, data related to surplus power, data related to power shortage, etc.) as evidence data, evidence regarding the use of renewable energy can be left. The above-described mechanism for tracking electricity using the blockchain network 100 can be a means for certifying the value of using renewable energy other than using a certificate. The above-described mechanism, especially with automation of the transaction system, can be a means for guaranteeing evidence for the value of using renewable energy at a low cost, compared with a cost required for issuing a certificate. Furthermore, unlike the case of issuing a certificate, actual use of renewable energy is facilitated as actual electric power is managed with a value for using renewable energy to produce such power. For example, the above-described mechanism can distinguish from a case where electric power produced from fossil fuel such as petroleum is actually consumed, but the value for using renewable energy is associated with such power consumption later. By standardizing the above-described mechanism using the blockchain network 100, a mechanism is created in which each entity (company) can easily participate in to facilitate the use of renewable energy. Supply-demand balance control of renewable energy by a plurality of companies has been conceived, but has not been developed into actual business operation. By providing an API to a new stakeholder of various types of energy, realization of such operation and creation of a new business are promoted.

In alternative to the above-described method of interchanging electric power, there has been proposed a method of adjusting electric power among multiple entities (companies), which are gathered by an aggregator. It is however required for such entities (for example, electric power companies) to each have a contract with the aggregator, and this may limit the aggregator's potential in adjustment. The blockchain network 100 itself can automatically execute a contract, in addition to keeping a record for evidence, to enable flexible transactions between companies via a blockchain ledger.

Further, in any one of the above-described embodiments, electricity is used as an example of asset. Examples of asset include any other asset that physically exists (or exists in reality), and any other asset that does not physically exist (or not exist in reality). The data related to electric power is an example of data related to asset. The data related to surplus power is an example of data related to surplus asset. The data related to power shortage is an example of data related to asset shortage.

Examples of asset that physically exists (or exists in reality) include, but are not limited to, foods such as grains, vegetables, fruits, meats, marine products or processed foods. When the assets are grains, vegetables and fruits, the data related to asset includes, as a type of production method, supplementary information indicating whether or not pesticides have been used, or information indicating a producer or a place of production.

When the asset is meat, the data related to asset includes, as a type of production method, supplementary information indicating whether or not the animal is bred using a genetically modified crop, or information indicating a producer or a place of production.

When the asset is a marine product such as fish or shellfish, the data related to asset includes, as a type of production method, supplementary information indicating a natural product or aquaculture, or information indicating a producer (fisherman) or a production area (fishing area).

When the asset is a processed product, the data related to asset includes, as a type of production method, supplementary information indicating an allergen, information indicating whether or not the product has been processed using a genetically modified crop, or information indicating a location of a processor or a processing plant.

Examples of asset that physically exists (or exists in reality) include, but are not limited to, real estate such as land and buildings, and movable property such as goods or quantity of goods.

When the asset is real estate, the data related to asset indicates supplementary information such as ownership of the asset. When the asset is movable property, the data related to asset indicates supplementary information such as ownership of the asset.

On the other hand, examples of asset that does not physically exist (or not exist in reality) include, but are not limited to, tokens (virtual currency) or quantity of tokens, carbon dioxide emission credits, intellectual property rights, and contracts.

When the asset is a token, the data related to asset indicates supplementary information on, for example, ownership of the asset.

When the asset is a carbon dioxide emission credit, the data related to asset indicates supplementary information on, for example, ownership of the asset.

When the asset is a right such as an intellectual property right, the data related to asset indicates supplementary information on, for example, the owner of the right, the transferee of the right, and the licensee.

When the asset is a contract, the data related to asset indicates supplementary information on such as contract conditions and contract performance. In addition or in alternative to contracts, treaties, agreements, promises, and memorandums (memos) may be treated as assets.

Further, other types of assets that can be managed in a substantially similar manner as the example case of electricity, to allow postpaid processing, include gas, water, and communication. In the case of gas, water, or communication, the data related to asset indicates attribute information such as ownership of the asset.

The electricity produced from solar light is an example of an asset produced by a specific type of production method. Examples of the asset produced by the specific type of production method include an asset produced by any one of various types of production method as described above.

In this disclosure, the CPU 101 may be a single device or a plurality of devices.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

Further, any of the above-described programs may be stored in a (non-transitory) recording medium for distribution.

Furthermore, although the above description refers to the "data related to a contract or contracts" or the "contract related data", the data including information on the price of electric power may be referred to as "data related to a price or prices". The "price" in this case also includes the "ratio corresponding to the price".

Any one of the above-described operations may be performed in various other ways, for example, in an order different from the one described above.

The invention claimed is:

1. A system on a blockchain network, the system comprising:

a first node;

a second node; and a third node, wherein the first node includes a first memory and first circuitry, the first memory including a first private area and a first public area, wherein the first private area is accessible by an entity involved in a specific transaction and having an access right, the first public area is accessible by any entity, the first private area stores first contract related data including a transaction price of an asset or a ratio corresponding to the transaction price of the asset, and the first public area stores power related data including power generation information, the first circuitry is configured to transmit the power related data and the first contract related data to the second node and the third node on the blockchain network every predetermined time to share the power related data and the first contract related data, the second node includes a second memory and second circuitry, the second memory includes a second private area and a second public area, the second circuitry is configured to store data related to electric power having been allocated to a consumer by supply-demand balance control in the second public area and second contract related data in the second private area, and transmit the data related to electric power having been allocated and the second contract related data to the first node and the third node every predetermined time to share the data related to electric power having been allocated and the second contract related data, the third node includes a third memory and third circuitry, the third memory includes a third private area and a third public area, and the third circuitry is configured to store data related to electric power being consumed in the third public area, and transmit the data related to electric power being consumed to the first node and the second node every predetermined time to share the data related to electric power being consumed.

2. The system of claim 1, wherein an access right to the contract related data is assigned to entities involved in a transaction of the asset.

3. The system of claim 1, wherein the power related data includes information indicating a type of a production method of the asset.

4. The system of claim 3, wherein the type of the production method indicates that the asset is produced using a predetermined type of resource.

5. The system of claim 1, wherein the power related data includes information indicating a transaction status of the asset.

6. The system of claim 5, wherein the information indicating the transaction status of the asset indicates one of production of the asset, intermediation of transfer of the asset, and use of the asset.

7. The system of claim 5, wherein the asset is electric power, and the information indicating the transaction status indicates charging or discharging of the electric power.

8. The system of claim 1, wherein the circuitry is further configured to receive data related to electric power having been allocated and the contract related data.

* * * * *